United States Patent
Islam et al.

(10) Patent No.: US 10,893,496 B2
(45) Date of Patent: Jan. 12, 2021

(54) BEAM SPECIFIC TIMING ADVANCE COMMAND PARAMETERS

(71) Applicant: QUALCOMM Incorporated, San Diego, CA (US)

(72) Inventors: Muhammad Nazmul Islam, Littleton, MA (US); Navid Abedini, Somerset, NJ (US); Bilal Sadiq, Basking Ridge, NJ (US); Peter Pui Lok Ang, San Diego, CA (US); Sundar Subramanian, San Diego, CA (US); Junyi Li, Chester, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/193,736

(22) Filed: Nov. 16, 2018

(65) Prior Publication Data

US 2019/0191399 A1  Jun. 20, 2019

Related U.S. Application Data

(60) Provisional application No. 62/607,729, filed on Dec. 19, 2017.

(51) Int. Cl.
*H04W 56/00* (2009.01)
*H04W 72/04* (2009.01)
*H04W 72/12* (2009.01)

(52) U.S. Cl.
CPC ....... *H04W 56/005* (2013.01); *H04W 56/009* (2013.01); *H04W 56/0045* (2013.01);
(Continued)

(58) Field of Classification Search
CPC .................................................. H04W 56/005
(Continued)

(56) References Cited

U.S. PATENT DOCUMENTS

| 2013/0301619 A1* | 11/2013 | Singh | H04W 56/004 |
| | | | 370/336 |
| 2013/0315214 A1* | 11/2013 | Bai | H04L 5/001 |
| | | | 370/336 |

(Continued)

OTHER PUBLICATIONS

Swamy, Kumara; How LTE Stuff Works: LTE: Timing Advance and Time Alignment Timer (Year: 2014).*

(Continued)

*Primary Examiner* — Peter G Solinsky
(74) *Attorney, Agent, or Firm* — Holland & Hart LLP

(57) ABSTRACT

Methods, systems, and devices for wireless communications are described. Generally, the described techniques provide for adjusting timing advance command parameters for specific beam pair links (BPLs) in a wireless communications system. In some cases, a base station may determine that transmission timing at a UE may be misaligned. The may send a timing advance (TA) command for the BPL. A UE may utilize more than one BPL, and may switch communications from a first BPL to second BPL. The second BPL may have a different timing misalignment than the first BPL, and the TA command sent by the base station may be insufficient to correct the timing misalignment of the second BPL. The base station may adjust the TA command parameters (e.g., TA command size or TA command granularity) so that the timing misalignment of the second BPL may be corrected.

28 Claims, 20 Drawing Sheets

(52) U.S. Cl.
CPC ....... *H04W 72/042* (2013.01); *H04W 72/046* (2013.01); *H04W 72/1268* (2013.01)

(58) Field of Classification Search
USPC .......................................................... 370/328
See application file for complete search history.

(56) References Cited

U.S. PATENT DOCUMENTS

| | | | |
|---|---|---|---|
| 2014/0092812 A1 | 4/2014 | Jang et al. | |
| 2017/0033854 A1* | 2/2017 | Yoo | H04W 24/00 |
| 2017/0331670 A1* | 11/2017 | Parkvall | H04W 52/0245 |
| 2018/0124724 A1* | 5/2018 | Tsai | H04W 56/0005 |
| 2018/0124733 A1* | 5/2018 | Vilaipornsawai | H04W 76/27 |
| 2018/0270792 A1* | 9/2018 | Park | H04W 76/27 |
| 2018/0270894 A1* | 9/2018 | Park | H04W 36/02 |
| 2018/0279286 A1* | 9/2018 | Akoum | H04W 74/0833 |
| 2019/0037423 A1* | 1/2019 | Yu | H04W 74/0833 |
| 2019/0053314 A1* | 2/2019 | Zhou | H04W 76/18 |
| 2019/0075014 A1* | 3/2019 | Zhou | H04L 41/0654 |
| 2019/0132040 A1* | 5/2019 | Bai | H04B 7/0695 |
| 2019/0132066 A1* | 5/2019 | Park | H04W 36/0094 |
| 2019/0141742 A1* | 5/2019 | Zhou | H04W 28/20 |
| 2019/0150141 A1* | 5/2019 | Irukulapati | H04W 56/0045 370/280 |
| 2019/0182800 A1* | 6/2019 | Park | H04B 7/0617 |
| 2019/0281571 A1* | 9/2019 | Ren | H04W 56/0045 |
| 2019/0289513 A1* | 9/2019 | Jeon | H04W 52/40 |
| 2019/0342925 A1* | 11/2019 | Zhang | H04W 52/42 |
| 2019/0373602 A1* | 12/2019 | Qin | H04W 72/0413 |

OTHER PUBLICATIONS

Intel Corporation: "On Timing Advance for Multi-beam Operation," 3GPP Draft, R1-1716297, 3rd Generation Partnership Project (3GPP), Mobile Competence Centre, 650, Route Des Lucioles, F-FRANC06921 Sophia-Antipolis Cedex vol. RAN WG1, No. Nagoya, Japan, Sep. 18, 2017-Sep. 21, 2017, Sep. 17, 2017 (Sep. 17, 2017), XP051339753, 4 pages, Retrieved from the Internet: URL: http://www.3gpp.org/ftp/Meetings 3GPPSYNC/RAN1/Docs/.

International Search Report and Written Opinion—PCT/US2018/061771—ISA/EPO—Feb. 12, 2019 (180689WO).

Qualcomm: "Summary of Remaining Details on RACH Procedure," 3GPP Draft, R1-1721689, 3rd Generation Partnership Project, Mobile Competence Centre, 650, Route Des Lucioles, F-06921 Sophia-Antipolis Cedex, France vol. RAN WG1, No. Reno, USA, Nov. 27, 2017-Dec. 1, 2017, Dec. 4, 2017 (Dec. 4, 2017), XP051370768, Retrieved from the Internet : URL:http://www.3gpp.org/ftpjtsg%5Fran/WG1%5FRL1/TSGR1%5F91/Docs/.

* cited by examiner

BEAM SPECIFIC TIMING ADVANCE COMMAND PARAMETERS

CROSS REFERENCES

The present Application for patent claims the benefit of U.S. Provisional Patent Application No. 62/607,729 by ISLAM, et al., entitled "BEAM SPECIFIC TIMING ADVANCE COMMAND PARAMETERS," filed Dec. 19, 2017, assigned to the assignee hereof, and expressly incorporated herein.

BACKGROUND

The following relates generally to wireless communication, and more specifically to beam specific timing advance command parameters.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some examples of a wireless communications system, a base station and a UE may communicate, for example using uplink (UL) transmissions from the UE to the base station, or downlink (DL) transmissions from the base station to the UE. An uplink transmission, for example, may have some delay between transmission at the UE and reception at the base station. To ensure that reception of various communications at the base station are aligned (compensating for the delay such that transmissions may be aligned), the base station may apply a timing advance (TA) to scheduled transmissions, and may indicate a TA value to various UEs within a geographic coverage area via a TA command.

In some cases, UEs within a wireless communications system may be highly mobile, and a TA value corresponding to different devices may become inaccurate as UEs change positions and/or operations. Further, in some examples of a wireless communications system (e.g., a 5G system), wireless nodes within a system may communicate via directional beams (e.g., beamformed for transmission from an antenna array at a wireless device). For example, a base station and a UE may communicate via beam pair links (BPLs), each BPL including a transmit beam of one wireless node (e.g. a UE) and a receive beam of a second wireless node (e.g., a base station). In some examples, a UE may multiplex various uplink transmissions on more than one BPL. BPLs may be highly directional, and uplink BPLs and downlink BPLs for the same UE may be the same or different. In such a configuration, different BPLs may have different round trip times (RTTs) due to non-reciprocity, or may have different RTTs due to mobility of the UE. Thus, various signals multiplexed by the UE may have different transmissions timings, and different TA command values and parameters may be applicable.

A TA command may have some values for the TA command, such as TA command size (e.g., number of bits) and a TA granularity (e.g., size of steps comprising a range of applicable timing adjustments). For example, a TA command may comprise six bits, and may comprise a TA granularity that is fine enough to cover a TA range of 16.67 microseconds. Such a TA command, with its associated TA granularity, may be sufficient to adjust a timing misalignment for a first BPL due to, for example, delay spread. In other words, timing misalignments on a first BPL may be small enough that a small TA granularity and small TA command size are sufficient to realign the timing misalignment of the first BPL. However, in some cases, due to mobility of the system, multiplexing across multiple BPLs, non-reciprocity, or other issues, a base station may issue a BPL change command, and a UE may switch from a first BPL to a second BPL. In such cases, the misalignment of the second BPL may be greater the misalignment of the first BPL. The TA command, having a first TA granularity and a first TA command size, may in some cases be sufficient to realign the transmission timing of the first BPL, but insufficient to successfully realign the transmission timing of the second BPL.

SUMMARY

The described techniques relate to improved methods, systems, devices, or apparatuses that support beam specific timing advance command parameters. Generally, the described techniques provide for adjusting timing advance command parameters for specific beam pair links (BPLs) in a wireless communications system. In some cases, a base station may determine that transmission timing at a UE may be misaligned. The base station may send a timing advance (TA) command for the BPL. A UE may utilize more than one BPL to communicate with a base station, and may switch communications from a first BPL to second BPL. The second BPL may have a different timing alignment (misalignment) than the first BPL, and the TA command sent by the base station may be insufficient to correct the timing misalignment of the second BPL. The base station may adjust the TA command parameters (e.g., TA command size, TA command granularity, and/or TA offset) so that the timing misalignment of the second BPL may be corrected.

A method of wireless communication is described. The method may include receiving, from a second wireless device, one or more TA commands for a first beam pair link (BPL), the one or more TA commands formatted according to a first value for a TA command parameter, receiving a beam switch command for the first wireless device to switch from communicating with the second wireless device using the first BPL to communicating with the second wireless device using a second BPL, identifying a second value for the TA command parameter based on the received beam switch command, and receiving, from the second wireless device, a TA command formatted according to the identified second value for the TA command parameter.

An apparatus for wireless communication is described. The apparatus may include means for receiving, from a second wireless device, one or more TA commands for a first BPL, the one or more TA commands formatted according to a first value for a TA command parameter, means for receiving a beam switch command for the first wireless device to switch from communicating with the second wireless device using the first BPL to communicating with the second wireless device using a second BPL, means for identifying a second value for the TA command parameter based on the received beam switch command, and means for receiving, from the second wireless device, a TA command formatted according to the identified second value for the TA command parameter.

Another apparatus for wireless communication is described. The apparatus may include a processor, memory in electronic communication with the processor, and instructions stored in the memory. The instructions may be operable to cause the processor to receive, from a second wireless device, one or more TA commands for a first BPL, the one or more TA commands formatted according to a first value for a TA command parameter, receive a beam switch command for the first wireless device to switch from communicating with the second wireless device using the first BPL to communicating with the second wireless device using a second BPL, identify a second value for the TA command parameter based on the received beam switch command, and receive, from the second wireless device, a TA command formatted according to the identified second value for the TA command parameter.

A non-transitory computer-readable medium for wireless communication is described. The non-transitory computer-readable medium may include instructions operable to cause a processor to receive, from a second wireless device, one or more TA commands for a first BPL, the one or more TA commands formatted according to a first value for a TA command parameter, receive a beam switch command for the first wireless device to switch from communicating with the second wireless device using the first BPL to communicating with the second wireless device using a second BPL, identify a second value for the TA command parameter based on the received beam switch command, and receive, from the second wireless device, a TA command formatted according to the identified second value for the TA command parameter.

In some examples of the method, apparatus, and non-transitory computer-readable medium described above, the TA command parameter includes a TA command size, or a TA granularity, or a combination thereof.

In some examples of the method, apparatus, and non-transitory computer-readable medium described above, receiving the TA command includes receiving the TA command with the beam switch command or in a next TA command following the beam switch command.

Some examples of the method, apparatus, and non-transitory computer-readable medium described above may further include processes, features, means, or instructions for receiving an indication of a second TA offset for the second BPL, the second TA offset different from a first TA offset for the first BPL.

In some examples of the method, apparatus, and non-transitory computer-readable medium described above, the received TA command includes the indication of the second TA offset.

Some examples of the method, apparatus, and non-transitory computer-readable medium described above may further include processes, features, means, or instructions for applying the second TA offset to an uplink transmission timing for the first wireless device based on receiving the beam switch command. Some examples of the method, apparatus, and non-transitory computer-readable medium described above may further include processes, features, means, or instructions for applying a TA value corresponding to the TA command to the uplink transmission timing.

Some examples of the method, apparatus, and non-transitory computer-readable medium described above may further include processes, features, means, or instructions for receiving an updated TA offset for the second BPL based on a number of TA commands received for the second BPL having exceeded a threshold.

Some examples of the method, apparatus, and non-transitory computer-readable medium described above may further include processes, features, means, or instructions for receiving a downlink control information (DCI) signal, or a media access control (MAC) control element (CE), or a radio resource control (RRC) signal, or a combination thereof, comprising the TA command, or the second value for the TA command parameter, or a combination thereof.

In some examples of the method, apparatus, and non-transitory computer-readable medium described above, the second value for the TA command parameter includes a TA granularity that may be coarser or finer than the first value for the TA command parameter of the one or more TA commands for the first BPL.

Some examples of the method, apparatus, and non-transitory computer-readable medium described above may further include processes, features, means, or instructions for identifying a third value for the TA command parameter to use for subsequent TA commands received from the second wireless device for the second BPL, the subsequent TA commands following the received TA command. Some examples of the method, apparatus, and non-transitory computer-readable medium described above may further include processes, features, means, or instructions for receiving one or more of the subsequent TA commands based on the identified third value for the TA command parameter.

In some examples of the method, apparatus, and non-transitory computer-readable medium described above, the second value for the TA command parameter includes a first TA granularity of the received TA command. In some examples of the method, apparatus, and non-transitory computer-readable medium described above, the third value for the TA command parameter includes a second TA granularity that may be coarser or finer than the first TA granularity.

In some examples of the method, apparatus, and non-transitory computer-readable medium described above, the received TA command includes more than six bits.

Some examples of the method, apparatus, and non-transitory computer-readable medium described above may further include processes, features, means, or instructions for identifying, for TA commands used for uplink transmission timing adjustment, a first TA command size, a second TA command size, and a third TA command size, where the identified second value for the TA command parameter includes one of the first TA command size, or the second TA command size, or the third TA command size.

In some examples of the method, apparatus, and non-transitory computer-readable medium described above, the first TA command size may be used for a first TA command in a random access response. In some examples of the method, apparatus, and non-transitory computer-readable medium described above, the second TA command size may be used for a second TA command in a MAC CE, or an RRC signal, or a DCI signal, or a combination thereof, and the second value for the TA command parameter includes the second TA command size. In some examples of the method, apparatus, and non-transitory computer-readable medium described above, the third TA command size may be used for a third TA command in a MAC CE.

In some examples of the method, apparatus, and non-transitory computer-readable medium described above, the first TA command size may be twelve bits. In some examples of the method, apparatus, and non-transitory computer-readable medium described above, the second TA command size may be more than six bits and less than twelve bits. In some examples of the method, apparatus, and non-transitory computer-readable medium described above, the third TA command size may be six bits.

In some examples of the method, apparatus, and non-transitory computer-readable medium described above, the TA command and the beam switch command may be received in a same control signal.

Some examples of the method, apparatus, and non-transitory computer-readable medium described above may further include processes, features, means, or instructions for receiving a first indication of a first combination of TA command size and TA granularity for the first BPL. Some examples of the method, apparatus, and non-transitory computer-readable medium described above may further include processes, features, means, or instructions for receiving a second indication of a second combination of TA command size and TA granularity for the second BPL.

A method of wireless communication is described. The method may include transmitting, to a second wireless device, one or more TA commands for a first BPL, the one or more TA commands formatted according to a first value for a TA command parameter, transmitting a beam switch command, the beam switch command for the first wireless device to switch from communicating with the second wireless device using the first BPL to communicating with the second wireless device using a second BPL, identifying a second value for the TA command parameter to use for TA commands transmitted to the second wireless device following the switch, and transmitting, to the second wireless device, a TA command formatted according to the identified second value for the TA command parameter.

An apparatus for wireless communication is described. The apparatus may include means for transmitting, to a second wireless device, one or more TA commands for a first BPL, the one or more TA commands formatted according to a first value for a TA command parameter, means for transmitting a beam switch command, the beam switch command for the first wireless device to switch from communicating with the second wireless device using the first BPL to communicating with the second wireless device using a second BPL, means for identifying a second value for the TA command parameter to use for TA commands transmitted to the second wireless device following the switch, and means for transmitting, to the second wireless device, a TA command formatted according to the identified second value for the TA command parameter.

Another apparatus for wireless communication is described. The apparatus may include a processor, memory in electronic communication with the processor, and instructions stored in the memory. The instructions may be operable to cause the processor to transmit, to a second wireless device, one or more TA commands for a first BPL, the one or more TA commands formatted according to a first value for a TA command parameter, transmit a beam switch command, the beam switch command for the first wireless device to switch from communicating with the second wireless device using the first BPL to communicating with the second wireless device using a second BPL, identify a second value for the TA command parameter to use for TA commands transmitted to the second wireless device following the switch, and transmit, to the second wireless device, a TA command formatted according to the identified second value for the TA command parameter.

A non-transitory computer-readable medium for wireless communication is described. The non-transitory computer-readable medium may include instructions operable to cause a processor to transmit, to a second wireless device, one or more TA commands for a first BPL, the one or more TA commands formatted according to a first value for a TA command parameter, transmit a beam switch command, the beam switch command for the first wireless device to switch from communicating with the second wireless device using the first BPL to communicating with the second wireless device using a second BPL, identify a second value for the TA command parameter to use for TA commands transmitted to the second wireless device following the switch, and transmit, to the second wireless device, a TA command formatted according to the identified second value for the TA command parameter.

In some examples of the method, apparatus, and non-transitory computer-readable medium described above, the TA command parameter includes a TA command size, or a TA granularity, or a combination thereof.

In some examples of the method, apparatus, and non-transitory computer-readable medium described above, transmitting the TA command includes transmitting the TA command with the beam switch command or in a next TA command following the beam switch command.

Some examples of the method, apparatus, and non-transitory computer-readable medium described above may further include processes, features, means, or instructions for transmitting an indication of a second TA offset for the second BPL to the second wireless device, the second TA offset different from a first TA offset for the first BPL.

Some examples of the method, apparatus, and non-transitory computer-readable medium described above may further include processes, features, means, or instructions for comparing a first round trip time (RTT) of the first BPL with a second RTT of the second BPL. Some examples of the method, apparatus, and non-transitory computer-readable medium described above may further include processes, features, means, or instructions for determining the second TA offset based on the comparing.

Some examples of the method, apparatus, and non-transitory computer-readable medium described above may further include processes, features, means, or instructions for determining that a number of TA commands transmitted for the second BPL exceeds a threshold. Some examples of the method, apparatus, and non-transitory computer-readable medium described above may further include processes, features, means, or instructions for transmitting an updated TA offset for the second BPL based on the determining.

Some examples of the method, apparatus, and non-transitory computer-readable medium described above may further include processes, features, means, or instructions for transmitting a DCI signal, or an RRC signal, or a MAC CE, or a combination thereof, comprising the TA command, or the TA command parameter, or a combination thereof, where the TA command parameter includes a TA granularity.

In some examples of the method, apparatus, and non-transitory computer-readable medium described above, the TA granularity may be coarser or finer than a previous TA granularity of a previous TA command transmitted by the first wireless device for the first BPL.

Some examples of the method, apparatus, and non-transitory computer-readable medium described above may further include processes, features, means, or instructions for identifying a third value for the TA command parameter to use for subsequent TA commands transmitted to the second wireless device for the second BPL following the transmitted TA command. Some examples of the method, apparatus, and non-transitory computer-readable medium described above may further include processes, features, means, or instructions for transmitting one or more of the subsequent TA commands based on the identified third value for the TA command parameter.

Some examples of the method, apparatus, and non-transitory computer-readable medium described above may further include processes, features, means, or instructions for transmitting the one or more TA commands for the first BPL formatted according to a first TA command size. Some examples of the method, apparatus, and non-transitory computer-readable medium described above may further include processes, features, means, or instructions for transmitting the TA command for the second BPL formatted according to a second TA command size, the identified second value for the TA command parameter comprising the second TA command size. Some examples of the method, apparatus, and non-transitory computer-readable medium described above may further include processes, features, means, or instructions for transmitting a third TA command formatted according to a third TA command size.

Some examples of the method, apparatus, and non-transitory computer-readable medium described above may further include processes, features, means, or instructions for transmitting a first indication of a first combination of TA command size and TA granularity for the first BPL. Some examples of the method, apparatus, and non-transitory computer-readable medium described above may further include processes, features, means, or instructions for transmitting a second indication of a second combination of TA command size and TA granularity for the second BPL.

A method of wireless communication is described. The method may include communicating with a second wireless device using a plurality of combinations of (BPLs and bandwidth parts (BWPs), identifying a first value for a TA command parameter for TA commands received from the second wireless device for a first combination of a first BPL and a first BWP, the first value for the TA command parameter one of a plurality of values for the TA command parameter, each of the plurality of values for the TA command parameter corresponding to one or more of the plurality of combinations of BPLs and BWPs, and receiving, from the second wireless device, a TA command for the first BPL based on the identified first value for the TA command parameter.

An apparatus for wireless communication is described. The apparatus may include means for communicating with a second wireless device using a plurality of combinations of BPLs and BWPs, means for identifying a first value for a TA command parameter for TA commands received from the second wireless device for a first combination of a first BPL and a first BWP, the first value for the TA command parameter one of a plurality of values for the TA command parameter, each of the plurality of values for the TA command parameter corresponding to one or more of the plurality of combinations of BPLs and BWPs, and means for receiving, from the second wireless device, a TA command for the first BPL based on the identified first value for the TA command parameter.

Another apparatus for wireless communication is described. The apparatus may include a processor, memory in electronic communication with the processor, and instructions stored in the memory. The instructions may be operable to cause the processor to communicate with a second wireless device using a plurality of combinations of BPLs and BWPs, identify a first value for a TA command parameter for TA commands received from the second wireless device for a first combination of a first BPL and a first BWP, the first value for the TA command parameter one of a plurality of values for the TA command parameter, each of the plurality of values for the TA command parameter corresponding to one or more of the plurality of combinations of BPLs and BWPs, and receive, from the second wireless device, a TA command for the first BPL based on the identified first value for the TA command parameter.

A non-transitory computer-readable medium for wireless communication is described. The non-transitory computer-readable medium may include instructions operable to cause a processor to communicate with a second wireless device using a plurality of combinations of BPLs and BWPs, identify a first value for a TA command parameter for TA commands received from the second wireless device for a first combination of a first BPL and a first BWP, the first value for the TA command parameter one of a plurality of values for the TA command parameter, each of the plurality of values for the TA command parameter corresponding to one or more of the plurality of combinations of BPLs and BWPs, and receive, from the second wireless device, a TA command for the first BPL based on the identified first value for the TA command parameter.

In some examples of the method, apparatus, and non-transitory computer-readable medium described above, the TA command parameter includes a TA command size, or a TA granularity, or a TA offset, or a combination thereof.

In some examples of the method, apparatus, and non-transitory computer-readable medium described above, each of the plurality of values for the TA command parameter corresponds to a respective one combination of the plurality of combinations of BPLs and BWPs.

Some examples of the method, apparatus, and non-transitory computer-readable medium described above may further include processes, features, means, or instructions for receiving a DCI signal, or an RRC signal, or a MAC CE, or a combination thereof, that includes an indication of the first value for the TA command parameter.

In some examples of the method, apparatus, and non-transitory computer-readable medium described above, identifying the first value for the TA command parameter further includes receiving an indication of a reference value for the TA command parameter. Some examples of the method, apparatus, and non-transitory computer-readable medium described above may further include processes, features, means, or instructions for identifying the first value for the TA command parameter based on the indication of the reference value for the TA command parameter.

In some examples of the method, apparatus, and non-transitory computer-readable medium described above, identifying the first value for the TA command parameter further includes identifying a reference combination of the plurality of combinations of BPLs and BWPs. Some examples of the method, apparatus, and non-transitory computer-readable medium described above may further include processes, features, means, or instructions for identifying the first value for the TA command parameter based on the identified reference combination.

Some examples of the method, apparatus, and non-transitory computer-readable medium described above may further include processes, features, means, or instructions for identifying a value for one or more additional TA command parameters based on the identified reference combination.

Some examples of the method, apparatus, and non-transitory computer-readable medium described above may further include processes, features, means, or instructions for identifying the reference combination may be based on a TA granularity for the reference combination, where the TA command parameter includes the TA granularity.

In some examples of the method, apparatus, and non-transitory computer-readable medium described above, at least two of the BWPs may have different subcarrier spacings.

A method of wireless communication is described. The method may include communicating with a second wireless device using a plurality of combinations of BPLs and BWPs, identifying a first value for a TA command parameter for TA commands transmitted to the second wireless device for a first combination of a first BPL and a first BWP, the first value for the TA command parameter one of a plurality of values for the TA command parameter, each of the plurality of values for the TA command parameter corresponding to one or more of the plurality of combinations of BPLs and BWPs, and transmitting, to the second wireless device, a TA command for the first BPL based on the identified first value for the TA command parameter.

An apparatus for wireless communication is described. The apparatus may include means for communicating with a second wireless device using a plurality of combinations of BPLs and BWPs, means for identifying a first value for a TA command parameter for TA commands transmitted to the second wireless device for a first combination of a first BPL and a first BWP, the first value for the TA command parameter one of a plurality of values for the TA command parameter, each of the plurality of values for the TA command parameter corresponding to one or more of the plurality of combinations of BPLs and BWPs, and means for transmitting, to the second wireless device, a TA command for the first BPL based on the identified first value for the TA command parameter.

Another apparatus for wireless communication is described. The apparatus may include a processor, memory in electronic communication with the processor, and instructions stored in the memory. The instructions may be operable to cause the processor to communicate with a second wireless device using a plurality of combinations of BPLs and BWPs, identify a first value for a TA command parameter for TA commands transmitted to the second wireless device for a first combination of a first BPL and a first BWP, the first value for the TA command parameter one of a plurality of values for the TA command parameter, each of the plurality of values for the TA command parameter corresponding to one or more of the plurality of combinations of BPLs and BWPs, and transmit, to the second wireless device, a TA command for the first BPL based on the identified first value for the TA command parameter.

A non-transitory computer-readable medium for wireless communication is described. The non-transitory computer-readable medium may include instructions operable to cause a processor to communicate with a second wireless device using a plurality of combinations of BPLs and BWPs, identify a first value for a TA command parameter for TA commands transmitted to the second wireless device for a first combination of a first BPL and a first BWP, the first value for the TA command parameter one of a plurality of values for the TA command parameter, each of the plurality of values for the TA command parameter corresponding to one or more of the plurality of combinations of BPLs and BWPs, and transmit, to the second wireless device, a TA command for the first BPL based on the identified first value for the TA command parameter.

In some examples of the method, apparatus, and non-transitory computer-readable medium described above, the TA command parameter includes a TA command size, or a TA granularity, or a TA offset, or a combination thereof.

In some examples of the method, apparatus, and non-transitory computer-readable medium described above, each of the plurality of values for the TA command parameter corresponds to a respective one combination of the plurality of combinations of BPLs and BWPs.

Some examples of the method, apparatus, and non-transitory computer-readable medium described above may further include processes, features, means, or instructions for transmitting a DCI signal, or an RRC signal, or a MAC CE, or a combination thereof, that includes an indication of the first value for the TA command parameter.

In some examples of the method, apparatus, and non-transitory computer-readable medium described above, identifying the first value for the TA command parameter further includes transmitting an indication of a reference value for the TA command parameter. Some examples of the method, apparatus, and non-transitory computer-readable medium described above may further include processes, features, means, or instructions for identifying the first value for the TA command parameter based on the indication of the reference value for the TA command parameter.

In some examples of the method, apparatus, and non-transitory computer-readable medium described above, identifying the first value for the TA command parameter further includes identifying a reference combination of the plurality of combinations of BPLs and BWPs. Some examples of the method, apparatus, and non-transitory computer-readable medium described above may further include processes, features, means, or instructions for identifying the first value for the TA command parameter based on the identified reference combination.

Some examples of the method, apparatus, and non-transitory computer-readable medium described above may further include processes, features, means, or instructions for identifying a value for one or more additional TA command parameters based on the identified reference combination.

Some examples of the method, apparatus, and non-transitory computer-readable medium described above may further include processes, features, means, or instructions for identifying the reference combination may be based on a TA granularity for the reference combination, where the TA command parameter includes the TA granularity.

In some examples of the method, apparatus, and non-transitory computer-readable medium described above, at least two of the BWPs may have different subcarrier spacings.

DETAILED DESCRIPTION

Figure 1:
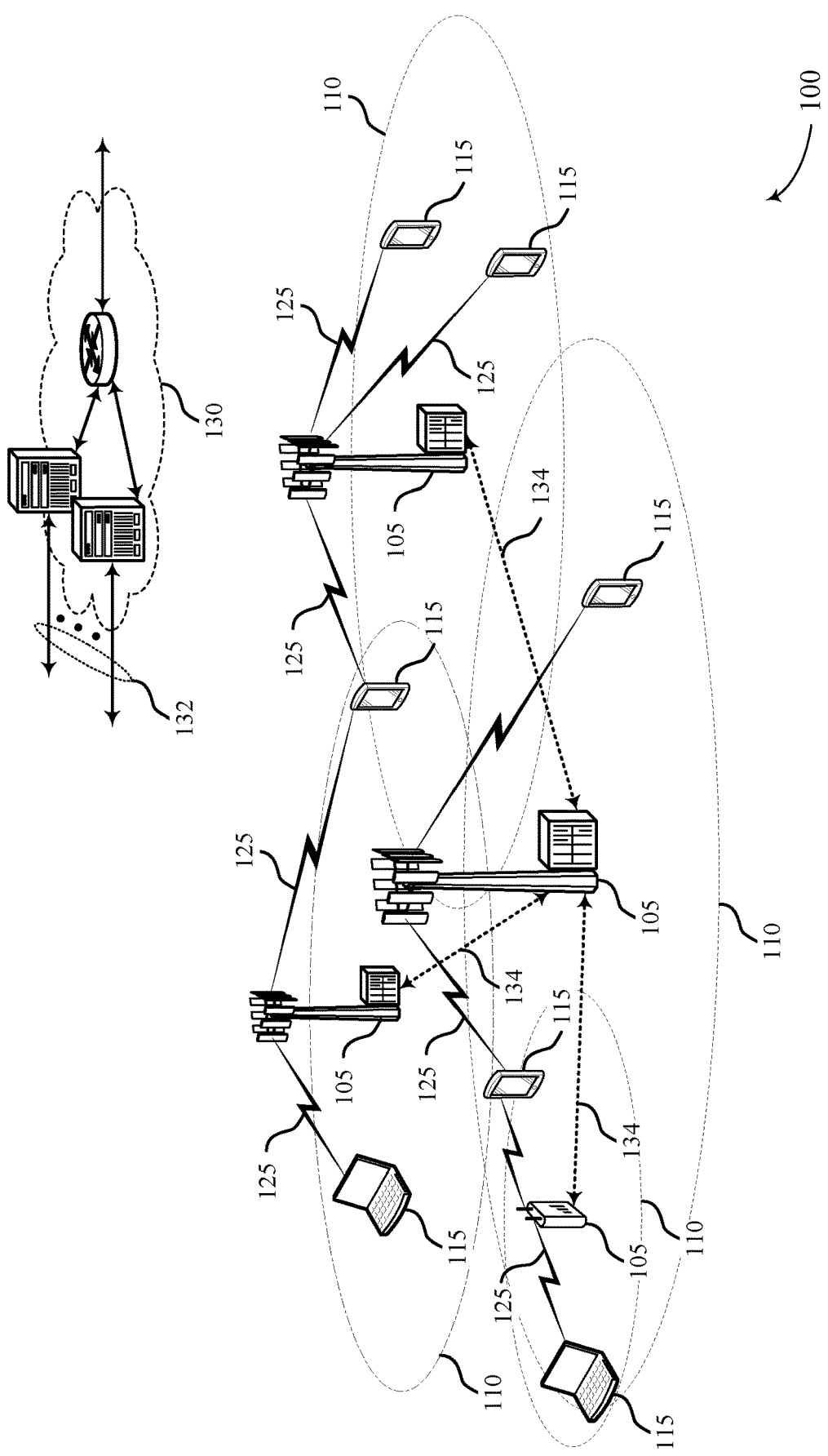
FIG. 1 illustrates an example of a system for wireless communication that supports beam specific timing advance command parameters in accordance with aspects of the present disclosure.

In some examples of a wireless communications system, A user equipment (UE) and a base station may communicate via uplink or downlink transmissions. A transmission may be sent, for example, from a UE to a base station, and may take some amount of time between transmission at the UE and reception at the base station. That delay may be accounted for by a timing advance (TA) value. That is, a TA value may be applied to the scheduling of an uplink transmission such that the uplink transmission is sent earlier to account for the delay. Thus, a first UE in a wireless communications system may have a first delay, and may apply a first TA value, and a second UE in a different location within the same wireless communications system may have a second delay and may apply a second TA value. The application of the first TA value and the second TA value to the first and second UEs may result in transmissions from the first UE and the second UE being aligned upon arrival at a base station. A base station may transmit a TA command to a UE to indicate to the UE the TA value that the UE should use for uplink transmissions. The TA command may include or indicate (e.g., explicitly or implicitly) a TA value. The TA command may have a TA granularity and a TA command size. The TA command may be formatted or have a TA command format based on at least the TA granularity, TA command case, or both. In some cases the TA command may have a TA granularity including a step size. That is, the TA command may carry an indication of whether a transmission timing should be advanced by some amount of time, or delayed by some amount of time, and the amount of time by which the transmission timing is to be advanced or delayed may be conveyed by a step. Thus, a large step size, or coarse TA granularity, covers a broad, less precise range of TA values, and a small step size, or a fine TA granularity, covers a more narrow, more precise range of TA values.

In some wireless communications systems, a TA value may be estimated by a base station based on a received random access channel (RACH) from the UE. The base station may transmit a TA command containing the TA value to the UE in a random access response (RAR). The TA command in the RAR may comprise, for example, 11 bits, and may cover a geographic area corresponding to a macro cell (e.g., with a radius of 160 km). In some examples (e.g., a 5G system), the TA command in the RAR may comprise up to 12 bits, which may increase the coverage area of the RAR and the TA command by allowing for a greater range of timing adjustment (e.g., for a cell with a radius of 320 km) at the same level of coarseness as the 11 bit TA command.

The base station may then regularly (e.g., during connected mode operation) estimate uplink timing based on uplink transmissions from the UE, such as a physical uplink control channel (PUCCH), a physical uplink shared channel (PUSCH), or a sounding reference signal (SRS). When uplink timing becomes misaligned, a base station may transmit an updated TA command to a UE to correct (realign) uplink transmission timing in a media access control (MAC) control element (CE). A UE may receive the TA command, and may adjust its uplink transmission timing according to the TA value. The TA command corresponding to the MAC CE may include, for example, six bits. The six bit TA command may have a TA granularity that permits the TA value to be equal to up to 16.67 microseconds. In some examples, a granularity of a TA command may be calculated as $$\text{TA command granularity} = 16*64*T_s, \text{ where } T_s = 1/(64*30.72*10^6).$$

In some cases, available bandwidth may be subdivided into bandwidth parts (BWPs), and different BWPs may have different subcarrier spacing. In a BWP with a high subcarrier spacing (e.g., 120 kHz) the symbol size may be less than the symbol periods of a BWP with a lower subcarrier spacing (e.g., 15 kHz). In some cases, for a TA command in a RAR, the TA granularity may depend on subcarrier spacing of the first uplink transmission after the RAR. For example, the subcarrier spacing of the first uplink transmission after a RAR may be 15 kHz, and the associated granularity (e.g., for a 12 bit TA command), may be given by $16*64\ T_s$. For 30 kHz subcarrier spacing the associated granularity (e.g., for a 12 bit TA command) may be given by $8*64\ T_s$. For 60 kHz subcarrier spacing the associated granularity (e.g., for a 12 bit TA command) may be given by $4*64\ T_s$. For 120 kHz subcarrier spacing the associated granularity (e.g., for a 12 bit TA command) may be given by $2*64\ T_s$.

In some cases, a timing advance group (TAG) may correspond to a single BWP. In such cases, for a TA command in a MAC CE, the TA granularity may be based on subcarrier spacing (SCS) of the uplink BWP in the TAG to which the TA command of the MAC CE corresponds. In some cases, a TAG may correspond to multiple BWPs. In such cases, TA granularity may depend on the maximum SCS of all semi-statically configured uplink transmissions within the TAG. Or, in other cases the TA granularity may depend on a maximum SCS of all activated uplink BWPs within the TAG. In other examples, the TA command or an additional field in the MAC CE may explicitly indicate the TA granularity of the TA command.

In some cases, for a TA command in a MAC CE, the TA granularity may depend on subcarrier spacing of the uplink (UL) BWP in the TAG that the TA in the MAC CE applies to when there is one configured UL BWP in the TAG. For example, the subcarrier spacing of the configured UL BWP may be 15 kHz, and the associated granularity (e.g., for a 6 bit TA command), may be given by $16*64\ T_s$. For 30 kHz subcarrier spacing the associated granularity (e.g., for a 6 bit TA command) may be given by $8*64\ T_s$. For 60 kHz subcarrier spacing the associated granularity (e.g., for a 6 bit TA command) may be given by $4*64\ T_s$. For 120 kHz subcarrier spacing the associated granularity (e.g., for a 6 bit TA command) may be given by $2*64\ T_s$.

In other cases, for a TA command for a MAC CE wherein there are multiple configured UL BWPs, there may be several alternatives for determining TA granularity. For example, one alternative may be determining TA granularity based on the maximum subcarrier spacing of all semi-statically configured uplinks (e.g., UL BWP, semi-static uplinks, or component carriers) within the TAG. A different alternative may be, for example, determining TA granularity based on the maximum subcarrier spacing of all activated UL BWPs within the TAG. Another alternative may be, for example, determining TA granularity based on a TA command or an additional field in the MAC CE which explicitly indicates the TA granularity that may be used.

In some cases, a wireless node (e.g., a UE) may communicate with another wireless node (e.g., a base station) via highly directional beam pair links (BPLs), each BPL including a transmit beam of one wireless node (e.g., a UE) and a receive beam of a second wireless node (e.g., a base station). In some examples, a UE may communicate with a base station simultaneously on more than one BPL. Different BPLs may have different round trip times (RTTs). In some examples, an uplink BPL and downlink BPL for the same UE may not have reciprocity. That is, the uplink BPL may not share the same physical path as the downlink BPL. For example, the uplink BPL may follow a first physical path (e.g., reflecting off of one or more surfaces), and the downlink BPL may follow a second, different physical path (e.g., reflecting off of one or more different surfaces). The downlink BPL's physical path may be longer or shorter in time, distance, or both, than the uplink BPL's physical path. Thus, a TA value for a first BPL may be different than a TA value for a second BPL.

In some examples, a UE may communicate on various uplink and downlink BPLs. Although an uplink BPL may have reciprocity with a corresponding downlink BPL, the UE may be scheduled (e.g., autonomously, or by a base station) to multiplex uplink transmission across more than one uplink BPLs into a first time duration and a second time duration. A first uplink BPL may have a first RTT, and a second uplink BPL may have a second RTT. A TA command, with a corresponding TA command size (e.g., number of bits) and TA granularity (e.g., coarse or fine step-size for TA adjustments), may be sufficient to realign a misaligned transmission timing on the first BPL. However, the same TA command may not be sufficient to successfully realign a misaligned transmission timing for the second BPL. Thus, when or after a BPL change command is received by a UE, a TA command size or a TA granularity may be adjusted to successfully align the transmission timing of the new BPL. In some examples, a base station may indicate, or a UE may identify, a transmission timing offset from the first BPL to the second BPL, and may autonomously add the offset to the TA command when a BPL change occurs.

In some examples, a UE may be highly mobile. Because the BPLs on which the UE communicates are highly directional, a RTT for a given BPL may change rapidly with time. Thus a TA value for a BPL that previously successfully aligned uplink transmission from the UE, may no longer successfully align the uplink transmission timing of a BPL within the time when the UE is highly mobile. Thus, uplink transmissions on such a BPL may be misaligned with by a greater amount of time with respect to other uplink transmission timings on other BPLs. In such cases, upon or after a BPL change command, a TA command size or a TA granularity may be adjusted to successfully align the transmission timing of the new BPL. In some examples, a base station may indicate or a UE may identify a transmission timing offset from the first BPL to the second BPL, and may autonomously add to or subtract the offset from the TA command when a BPL change occurs.

When a BPL change command is received, for example indicating a change from communications on a first BPL to communications on a second BPL, a UE may identify a granularity or a size of a TA command corresponding to the second BPL. In some cases, to address a potential misaligned of transmission timing that is greater on the second BPL than on the first BPL, the TA command may be configured with a coarser TA granularity. The TA command with the coarser TA granularity may have a larger step size to address the larger misalignment of the second BPL. In some cases, the MAC CE carrying the TA command may also include an indication of the adjusted TA granularity. Alternatively, a base station may transmit a TA command having a greater TA granularity after every BPL change command, and may transmit a TA command having a different or standard TA granularity with every MAC CE that does not accompany a BPL change command.

In some cases, to address a potentially greater misalignment of transmission timing on a second BPL, the size of the TA command may be adjusted. For example, a TA command carried in a RAR (e.g., after a cell change) may have twelve bits, and a TA command carried in a MAC CE to address regular TA adjustments across time may have six bits. TA commands following a BPL change command (e.g., carried in a MAC-CE, a RRC message, or a downlink control information (DCI) signal), may have a size greater than six bits, but less than twelve bits. In some examples, the RRC signal may be conveyed in a remaining minimum system information (RMSI) signal, or in an other system information block (OSIB) signal, or both. In some cases, a one-time TA command may be included in a MAC CE, an RRC message, or a DCI signal together with a BPL change command.

In some cases, upon establishing one or more BPLs on which a UE may communicate with a base station, a TA offset may be established. The TA offset may represent the difference between the RTT of, for example, a first BPL and a second BPL. The first BPL and the second BPL may have different TA command parameter formats, such that upon changing from the first BPL to the second BPL, the appropriate TA command parameters may be applied to the second BPL. In some examples, instead of automatically adjusting a TA command, TA granularity, or applying a TA offset upon changing from a first BPL to a second BPL, a base station may configure BPL specific TA commands having BPL specific TA command size and TA granularity.

In some examples, different BPLs may correspond to different BWPs. As discussed above, different BPLs may utilize different TA command granularities to successfully realign transmission timing. Additionally, TA granularity may be different in different BWPs, SCS results in different TA granularity. Thus, a successfully TA granularity may be based on both a current BPL, and a BWP to which the current BPL corresponds. In some examples, a base station and a UE may be configured to identify a unique TA granularity based on a currently assigned BPL and a corresponding BWP. That is, a UE may receive a BPL change command and, based on the new BPL and the corresponding BWP, the UE may know to receive a TA command having a particular TA granularity. The unique TA command granularities may be indicated in a MAC CE each time a new TA command is received, or a UE may receive the unique TA command granularities via RRC signaling, and the TA command or its corresponding MAC CE may indicate which of the unique TA command granularities corresponds to the current TA command. In some examples, the RRC signal may be conveyed in an RMSI signal or in an OSIB signal. Alternatively, a certain combination of BPL and BWP may be identified as a reference combination, and TA granularity and TA offset may be identified based on the reference combination. The reference combination may be identified based on a finest or coarsest TA granularity, for example the BPL and BWP combination having the coarsest or finest TA granularity.

Aspects of the disclosure are initially described in the context of a wireless communications system. Aspects of the disclosure are further described in the context of beam specific timing parameter schemes and process flows. Aspects of the disclosure are further illustrated by and described with reference to apparatus diagrams, system diagrams, and flowcharts that relate to beam specific timing advance command parameters.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some instances, a UE 115 may utilize more than one BPL for wireless communications. Base station 105 may identify that a first BPL used by a UE has a timing misalignment. Base station 105 may transmit a TA command to UE 115 to correct the timing misalignment. UE 115 may switch communications from a first BPL to a second BPL, and the second BPL may have a different timing misalignment that the first BPL. Base station 105 may adjust the TA command parameters (e.g., TA command size and TA granularity) such that the following TA commands may realign the transmission timing of the second BPL.

Figure 2A:
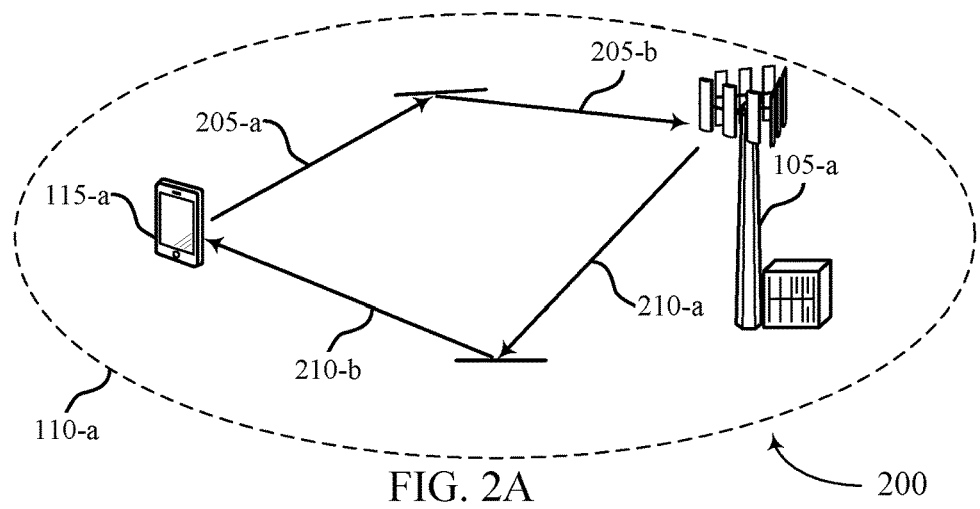
FIG. 2A illustrates an example of a wireless communications system that supports beam specific timing advance command parameters in accordance with aspects of the present disclosure.

FIG. 2A illustrates an example of a wireless communications system 200 that supports beam specific timing advance groups in accordance with various aspects of the present disclosure. In some examples, wireless communications system 200 may implement aspects of wireless communications system 100. Wireless communications system 200 may include a first wireless node, and a second wireless node. In some examples, the first wireless node may be a base station 105-a, and a second wireless node may be a UE 115-a, which may be examples of the corresponding devices described with reference to FIG. 1. In some cases, a second node may be base stations 105, where base station 105-a is a scheduling base station. In some examples, a first wireless node may be a base station 105 or relay, scheduling a second base station 105 or relay in a backhaul network or integrated access backhaul network (IAB). In some examples, a first wireless node may be a scheduling UE 115, and the second and third wireless nodes may be non-scheduling UE 115. For purpose of illustration only, the first wireless node may be referred to as base station 105-a, and the second wireless node may be referred to as UE 115-a. But, it should be understood that these are by way of example only, and that base station 105-a, UE 115-a, and UE 115-b could be examples of various wireless nodes as noted above and could be in communication with additional wireless nodes.

In some examples, a base station 105-a may communicate with one or more UEs 115 that are located within geographic coverage area 110-a. In some cases, due to propagation delay, or transmission and reception delays, a transmission timing may become misaligned. For example, base station 105-a may determine that an uplink transmission timing from UE 115-a has fallen behind, resulting in collisions or interference at base station 105-a. Base station 105-a may transmit a TA command to UE 115-a, and the TA command may include a TA value. UE 115-a may apply the TA value its uplink transmission timing, and the applied TA value may realign the uplink transmission timing with some common reference timing such that reception timing at base station 105-a does not result in any more interference. The TA command may have a TA command size (e.g., a number of bits), and the TA value may have a granularity (e.g., step size) that covers a certain range of possible TA values (e.g., the maximum TA value is a function of the step size of the possible TA values included in the TA command).

In some examples, base station 105-a may communicate with UEs 115 via highly directional BPLs. Each BPL may include a transmit beam (e.g. of uplink BPL 205-a and downlink BPL 210-a) and a receive beam (e.g., receive beam of uplink BPL 205-b, and receive beam of downlink BPL 210-b). For example, UE 115-a may communicate with base station 105-a via uplink BPL 205 and downlink BPL 210. In some examples, uplink BPL 205 and downlink BPL 210 may not be reciprocal BPLs, and therefore may not have the same physical path or the same RTT as each other.

Because uplink BPL 205 and downlink BPL 210 may not have the same RTT, propagation delay and transmission or reception delays may not be the same for each BPL. Thus, if an uplink BPL 205 has a first RTT, it may have a first misalignment with respect to a reference transmission timing. However, a downlink BPL 210 may have a second misalignment with respect to a reference transmission timing. If the second misalignment is greater than the first misalignment, then a range of timing adjustments covered by a TA value received in a TA command that is sufficient to realign the first misalignment may not be sufficient to realign the second misalignment.

Figure 2B:
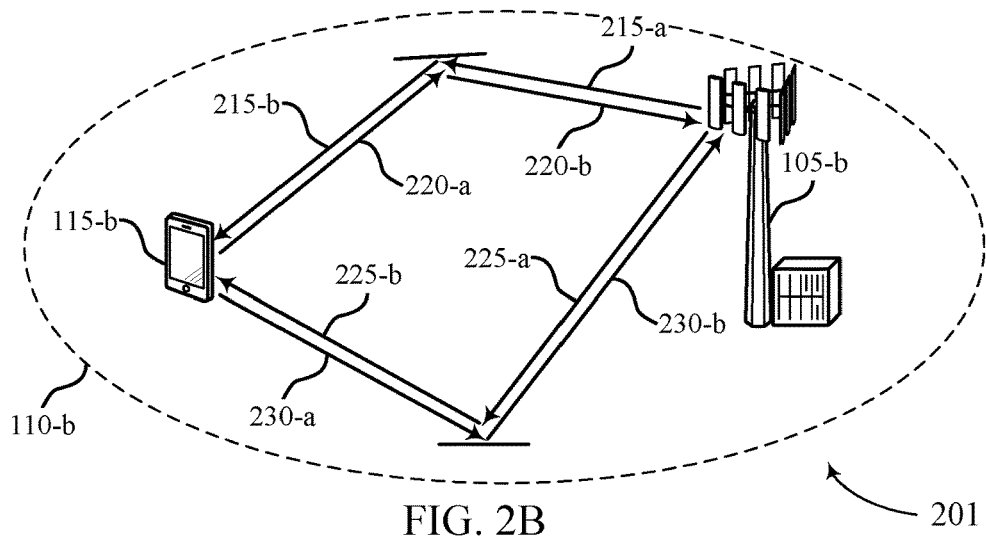
FIG. 2B illustrates an example of a wireless communications system that supports beam specific timing advance command parameters in accordance with aspects of the present disclosure.

FIG. 2B illustrates another example of a wireless communications system 201 that supports beam specific timing advance groups in accordance with various aspects of the present disclosure. In some examples, wireless communications system 201 may implement aspects of wireless communications systems 100 and 200. Wireless communications system 201 may include a first wireless node, and a second wireless node. By way of example, a first wireless node may be base station 105-*b*, and a second wireless node may be UE 115-*b*.

In some examples, base station 105-*b* may communicate with UEs 115 via highly directional BPLs. In some examples, UE 115-*b* may communicate with base station 105-*b* simultaneously on more than one BPL, such as BPLs 215, 220, 225, and 230. In some cases, each BPL may have different RTTs. For example, UE 115-*b* may be highly mobile, resulting in different RTTs for each BPL. In other examples, UE 115-*b* may send uplink transmissions via uplink BPL 220 and via uplink BPL 230. For instance, UE 115-*b* may multiplex various uplink transmissions across both uplink BPL 220 and uplink BPL 230. BPL 220 and BPL 230 may utilize different physical paths, may be reflected off of various surfaces, and therefore may have different RTTs. In such cases, uplink transmissions may suffer from collisions and interference due to timing misalignments. Further, if all transmission timings corresponding to all BPLs of UE 115-*b* are realigned using the same TA value, in some cases one or more BPLs may still be misaligned due to the different RTTs of each BPL.

In some examples, base station 105-*b* may communicates with UE 115-*b* using an available bandwidth may be subdivided into BWPs, and different BWPs within the available bandwidth may utilize different subcarrier spacing. In some examples, BPLs 215 and 220 may be transmitted in a first BWP that utilizes a first subcarrier spacing, and BPLs 225 and 230 may be transmitted in a second BWP that utilizes a second subcarrier spacing that is different than the first subcarrier spacing. In such cases, a TA command with a respective TA granularity covering a range of possible timing adjustments may be sufficient to resolve timing misalignments in the first BWP, while being insufficient to resolve timing misalignments in the second BWP.

Figure 2C:
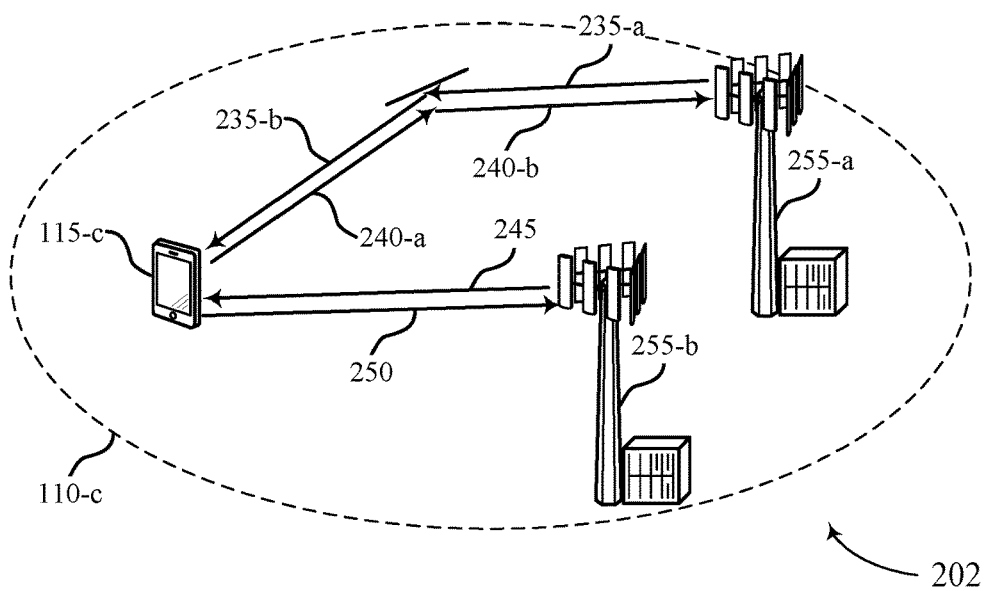
FIG. 2C illustrates an example of a wireless communications system that supports beam specific timing advance command parameters in accordance with aspects of the present disclosure.

FIG. 2C illustrates another example of a wireless communications system 202 that supports beam specific timing advance groups in accordance with various aspects of the present disclosure. In some examples, wireless communications system 202 may implement aspects of wireless communications systems 100, 200, and 201. Wireless communications system 202 may include a first wireless node, a second wireless node, and a third wireless node. In some examples, a network entity may communicate with UEs 115 through a number of other access network transmission entities, which may be referred to as a radio head, a smart radio head, or a transmission/reception point (TRP). By way of example, a first wireless node may be a network entity or base station 105-*c*, and a second wireless node may be a network entity or TRP 255-*a* and a third wireless node may be TRP 255-*b*.

In some examples, UE 115-*c* may communicate with TRP 255-*a* and TRP 255-*b* via multiple BPLs (e.g., BPL 235, 240, 245, and 250). In some cases, RTTs for BPLs 245 and 250 may be different, despite their reciprocity, due to mobility of UE 115-*c*. In some cases, RTTs for BPLs 245 and 250, and RTTs for BPLs 235 and 240, may be different, even while UE 115-*c* communicates simultaneously with TRP 255-*a* and TRP 255-*b*, each of which may be associated with the same base station 105.

In such cases, uplink transmissions may suffer from collisions and interference due to timing misalignments. Further, if all transmission timings corresponding to all BPLs of UE 115-*c* are realigned using the same TA value, in some cases one or more BPLs may still be misaligned due to the different RTTs of each BPL.

In some examples, UE 115-*c* may communicate with TRP 255-*a* and TRP 255-*b* via multiple BWPs (e.g., BPLs 235 and 240 are transmitted in a first BWP, and BPLs 245 and 250 are transmitted in a second BWP). In such cases, a TA command with a respective TA granularity and range of possible transmission timing adjustments may be sufficient to resolve timing misalignments in the first BWP, while being insufficient to resolve timing misalignments in the second BWP.

Referring to FIGS. 2A, 2B, and 2C, a UE 115 and a base station 105 communicating via multiple BPLs may experience collisions and interference as a result of misalignment of various BPLs. In some wireless communications systems, a base station 105 may transmit a TA command, indicating a TA value with which to adjust transmission timing to compensate for propagation delays or other causes of misalignment. The TA command may comprise a value for the TA command, such as a TA command size (e.g., number of bits) and a TA granularity (e.g., size of steps comprising a range of applicable timing adjustments). In some examples, the TA command may carry a TA offset to apply to a TA command for a new BPL. However, if a UE 115 is utilizing multiple BPLs, then a TA command (and its respective TA command size and TA granularity) that may be sufficient to adjust a timing misalignment for a first BPL may not resolve the misalignment of a second BPL, where the timing misalignment of the second BPL is different than the timing misalignment of the first BPL.

In some wireless communications systems, an available bandwidth may be subdivided into BWPs, and different BWPs may have different subcarrier spacings. BWPs with different subcarrier spacings may require different TA granularities to sufficiently adjust a timing misalignment of a BPL within each different BWP. If a UE 115 is utilizing multiple BWPs, it may determine that it must switch transmissions from a first BWP to a second BWP. In such a case, a TA command (and its respective TA command size and TA granularity) that may be sufficient to adjust a timing misalignment for a first BWP may not resolve the misalignment of a second BWP, wherein the subcarrier spacing of the second BWP is different than the subcarrier spacing of the first BWP. A base station 105 may dynamically indicate values for TA command parameters upon or after a beam switch command. In some examples, different values for TA command parameters may be known or assumed based on a type of signaling (e.g., a UE 115 may know a TA command size or a TA granularity based on whether it is receiving a first TA command following a beam switch command or a subsequent TA command after the first TA command, or a UE 115 may know a TA command size based on what type of signal it is receiving (e.g., RAR, MAC CE, DCI, RRC, etc.).

In some examples, a base station 105 may adjust the values of the TA command parameters which define TA command properties (e.g., TA command size, TA granularity, TA offset), and the adjusted properties may be sufficient to resolve a timing misalignment in the case of a BPL or a BWP switch. The adjusted value for the TA command may be a larger or smaller TA command size, a coarser or finer TA granularity, or a larger or smaller TA offset. For example, a TA command may be known at a UE 115, and each TA command adjustment may be unique and associated with a specific combination of BWP and BPL. In such a case, a UE 115 may autonomously adjust a TA command when switching to different combination of BWP and BPL. In some examples, a base station 105 or a UE 115 may select a combination of BPL and BWP upon which the UE and the base station are communication, to serve as a reference BPL with corresponding reference BPL and BWP combination. Transmission timing adjustments signaled in a TA command may reflect an offset from the reference BPL and corresponding BPL and BWP combination. That is, a TA command may indicate an offset from a current transmission timing, an offset in TA granularity, or a change in TA size from a current or most recent TA granularity, an offset from a previous TA command size, or some combination thereof. The reference BPL and corresponding BPL and BWP combination may be based on a BPL having a finest TA granularity or a coarsest TA granularity.

A UE 115 may receive, from a base station 105, one or more TA commands for a first BPL, the one or more TA commands formatted according to a first value for a TA command parameter, receive a beam switch command to switch from communicating with the base station 105 using the first BPL to communicating with the base station 105 using a second BPL, identifying a second value for the TA command parameter based on the received beam switch command, and receiving, from the base station 105, a TA command formatted according to the identified second value for the TA command parameter. An advantage of receiving such TA commands and beam switch command may be to improve timing control and maintain timing synchronization, even where a transmission path or round trip time may be changing.

In some examples the TA command parameter may include a TA command size, or a TA granularity, or a combination thereof. Including a TA command size or a TA granularity, or a combination thereof may further improve timing alignment and synchronization, even where different BWPs have different granularities, where path loss or round trip time for a BPL is changing, or where BPLs have different misalignments at different times (e.g., after specific operations).

In some examples, the UE 115 may receive the TA command with the beam switch command or in a next TA command following the beam switch command. Receiving the TA command with the beam switch command or in a next TA command following the beam switch command may increase the speed at which timing misalignment may be corrected, and improve overall system efficiency.

In some examples, the UE 115 may receive an indication of a second TA offset for the second BPL, the second TA offset different from a first TA offset for the first BPL. Receiving a TA offset for the second BPL that is different from the first TA offset for the first BPL may allow for correction of timing misalignment on a per BPL basis, increasing overall system efficiency.

A base station 105 may transmit to a UE 115, one or more TA commands for a first BPL, the one or more TA commands formatted according to a first value for a TA command parameter, transmitting a beam switch command, the beam switch command for the first wireless device to switch from communicating with the UE 115 using the first BPL to communicating with the second wireless device using a second BPL, identifying a second value for the TA command parameter to use for TA commands transmitted to the UE 115 following the switch, and transmitting, to the UE 115, a TA command formatted according to the identified second value for the TA command parameter. An advantage of transmitting such TA commands and beam switch command may be to improve timing control and maintain timing synchronization, even where a transmission path or round trip time may be changing.

In some examples the TA command parameter may include a TA command size, or a TA granularity, or a combination thereof. Including a TA command size or a TA granularity, or a combination thereof may further improve timing alignment and synchronization, even where different BWPs have different granularities, where path loss or round trip time for a BPL is changing, or where BPLs have different misalignments at different times (e.g., after specific operations).

In some examples, the base station 105 may transmit the TA command with the beam switch command or in a next TA command following the beam switch command. Transmitting the TA command with the beam switch command or in a next TA command following the beam switch command may increase the speed at which timing misalignment may be corrected, and improve overall system efficiency.

In some examples, the base station 105 may transmit an indication of a second TA offset for the second BPL, the second TA offset different from a first TA offset for the first BPL. Receiving a TA offset for the second BPL that is different from the first TA offset for the first BPL may allow for correction of timing misalignment on a per BPL basis, increasing overall system efficiency.

In some examples, a UE 115 may communicate with a base station 105 using a plurality of combinations of BPLs and BWPs, identify a first value for a TA command parameter for TA commands received from the base station 105 for a first combination of a first BPL and a first BWP, the first value for the TA command parameter one of a plurality of values for the TA command parameter, each of the plurality of values for the TA command parameter corresponding to one or more of the plurality of combinations of BPLs and BWPs, and receiving, from the base station 105, a TA command for the first BPL based on the identified first value for the TA command parameter. An advantage of TA commands for different combinations of BPLs and BWPs may be to improve timing control and maintain timing synchronization, even where a transmission path or round trip time may be changing, for specific BPL and BWP combinations.

In some examples, the TA command parameter includes a TA command size, or a TA granularity, or a TA offset, or a combination thereof. Including a TA command size or a TA granularity, or a combination thereof may further improve timing alignment and synchronization, even where different BWPs have different granularities, where path loss or round trip time for a BPL is changing, or where BPLs have different misalignments at different times (e.g., after specific operations).

In some examples, each of the plurality of values for the TA command parameter corresponds to a respective one combination of the plurality of combinations of BPLs and BWPs. An advantage of the plurality of values for the TA command parameter corresponding to a respective combination of the plurality of combinations of BPLs and BWPs may be that timing realignment can be performed even where BWP granularity is different, or where BPLs on different BWPs are misaligned by different amounts of time.

Some examples the UE 115 may receive a DCI signal, or an RRC signal, or a MAC CE, or a combination thereof, that includes an indication of the first value for the TA command parameter. An advantage of receiving the indication of the first value for the TA command parameter in a DCI signal, or an RRC signal, or a MAC CE, or a combination thereof is that different timing misalignments may occur after different types of signaling (e.g., a DCI signal, or an RRC signal, or a MAC CE, or a combination thereof), and including the TA command parameter in the relevant signal may further improve timing alignment and synchronization.

A base station 105 may communicate with a UE 115 using a plurality of combinations of BPLs and BWPs, identifying a first value for a TA command parameter for TA commands transmitted to the UE 115 for a first combination of a first BPL and a first BWP, the first value for the TA command parameter one of a plurality of values for the TA command parameter, each of the plurality of values for the TA command parameter corresponding to one or more of the plurality of combinations of BPLs and BWPs, and transmitting, to the UE 115, a TA command for the first BPL based on the identified first value for the TA command parameter. An advantage of TA commands for different combinations of BPLs and BWPs may be to improve timing control and maintain timing synchronization, even where a transmission path or round trip time may be changing, for specific BPL and BWP combinations.

In some examples, the TA command parameter includes a TA command size, or a TA granularity, or a TA offset, or a combination thereof. Including a TA command size or a TA granularity, or a combination thereof may further improve timing alignment and synchronization, even where different BWPs have different granularities, where path loss or round trip time for a BPL is changing, or where BPLs have different misalignments at different times (e.g., after specific operations).

In some examples, each of the plurality of values for the TA command parameter corresponds to a respective one combination of the plurality of combinations of BPLs and BWPs. An advantage of the plurality of values for the TA command parameter corresponding to a respective combination of the plurality of combinations of BPLs and BWPs may be that timing realignment can be performed even where BWP granularity is different, or where BPLs on different BWPs are misaligned by different amounts of time.

Some examples of the method, apparatus, and non-transitory computer-readable medium described above may further include processes, features, means, or instructions for transmitting a DCI signal, or an RRC signal, or a MAC CE, or a combination thereof, that includes an indication of the first value for the TA command parameter. An advantage of receiving the indication of the first value for the TA command parameter in a DCI signal, or an RRC signal, or a MAC CE, or a combination thereof is that different timing misalignments may occur after different types of signaling (e.g., a DCI signal, or an RRC signal, or a MAC CE, or a combination thereof), and including the TA command parameter in the relevant signal may further improve timing alignment and synchronization.

Figure 3:
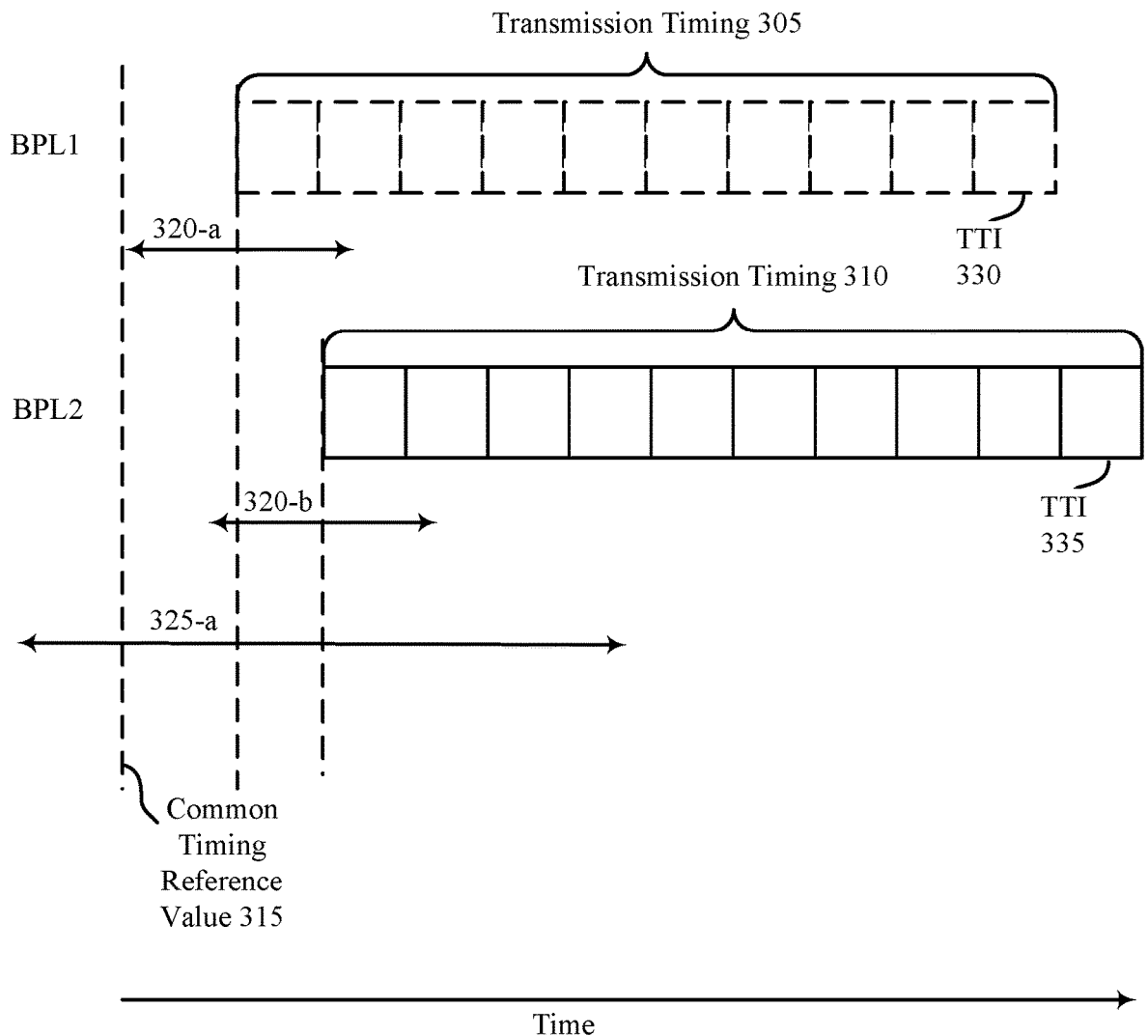
FIG. 3 illustrates an example of a timing alignment scheme that supports beam specific timing advance command parameters in accordance with aspects of the present disclosure.

FIG. 3 illustrates an example of a timing alignment scheme that supports beam specific TA parameters in accordance with various aspects of the present disclosure. In some examples, timing alignment scheme 300 may implement aspects of wireless communications system 100, 200, 201, and 202. Aspects of timing alignment scheme 300 may be implemented by a UE 115 and a base station 105, which may be examples of corresponding deices with respect to wireless communications systems 100, 200, 201, and 202.

In some examples, as discussed with respect to FIG. 2, a UE 115 may be configured to communicate with a base station 105 via multiple BPLs (e.g., BPL1 and BPL2). While communicating on BPL1, UE 115 may receive one or more TA commands having a TA command size (e.g., number of bits) and a TA granularity (e.g., a step size indicated by the TA command). However, the range of timing advance values covered by a TA command for BPL1 may not be sufficient to successfully realign a misaligned transmission timing of BPL2. Thus, a TA granularity may be adjusted to extend the range of timing advance values.

For example, transmission timing 305 of BPL1 may be misaligned by a first amount of time, and transmission timing 310 of BPL2 may be misaligned by a second amount of time. In some examples, the second amount of time may be greater than the first amount of time. A TA command with a first TA granularity may cover a range 320 of timing advance values. The range 320-a may be centered on the beginning of the first TTI 330 of transmission timing 305. That is, a TA command with the first TA granularity may carry a TA value that can advance or delay transmission timing 305 by some amount of time not exceeding range 320-a. For example, a TA granularity covering range 320 of timing advance values may include a maximum timing advance (or delay) value not exceeding the maximum timing advance (or delay) value allowed by range 320. For example, if a TA command with a first TA granularity covers range 320 (which ranges from −16.67 microseconds to 16.67 microseconds), the TA command may not apply a TA value that exceeds an advance (or delay) of 16.67 microseconds.

UE 115 may receive a beam switch command, and may cease communications on BPL1 and initiate communications on BPL2. In some examples, communications on BPL2 may be initiated prior to ceasing communications on BPL1. Transmission timing 310 may be misaligned by a greater amount of time than transmission timing 305. In such cases, range 320 of timing advance values may not be sufficient to realign transmission timing 310. That is, applying a maximum timing advance or delay within range 320-b may not be sufficient to realign transmission timing 310 with respect to common timing reference value 315 (e.g., transmission timing 310 is misaligned by more than 16.67 microseconds).

Thus, base station 105 may adjust the TA granularity of a TA command to cover a larger range 325-a of TA values without changing the size (e.g., number of bits) of the TA command. The range 325-a may be centered on the first TTI 335 of transmission timing 310. That is, base station 105 may adjust the TA granularity of a TA command to be more coarse. Thus, a TA command that has the same size as that used with respect to BPL1, may cover a larger range 325-a of TA values (e.g., each step of the TA command is larger, covering a larger range 325-a). Timing advance of range 325-a may be large enough as a result of the more coarse TA granularity, to successfully realign transmission timing 310 with respect to common timing reference value 315.

In some examples, when UE 115 transitions from BPL1 to BPL2, base station 105 may expressly indicate the TA granularity of a current or next TA command in the same signal that carries the next TA command (e.g., a MAC CE, or a DCI signal, or an RRC signal). In some examples, the RRC signal may be conveyed in an RMSI signal or in an OSIB signal. In other examples, a base station 105 and a UE 115 may be configured to assume that a next TA command immediately following a beam switch command may have a different TA granularity than all other TA commands. For example, a TA command having a TA granularity covering range 320 of TA values may be transmitted normally for each necessary TA adjustment. However, following a beam switch command, the next TA command may be known to have a TA granularity covering range 325 of TA values. Following that TA command, subsequent TA commands may have a TA granularity covering range 320 of TA values until the next beam switch command.

In some examples, transmission timing 305 may have a transmission time interval TTI 330. In some examples, transmission timing 310 may have a TTI 335.

Figure 4A:
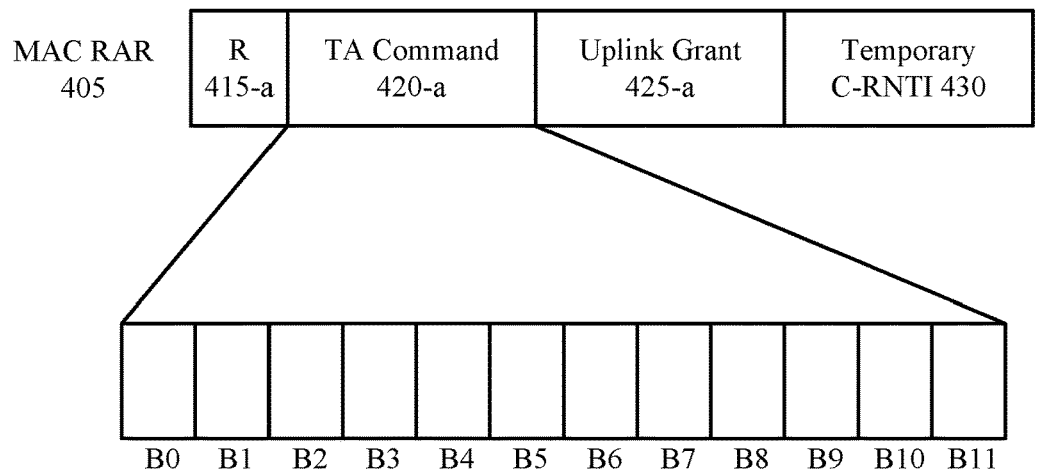
FIG. 4A illustrates an example of a MAC RAR format that supports beam specific timing advance command parameters in accordance with aspects of the present disclosure.

FIG. 4A illustrates a MAC RAR format 400 that supports beam specific TA parameters in accordance with various aspects of the present disclosure. In some examples, MAC RAR format 400 may implement aspects of wireless communications system 100, 200, 201, and 202. Aspects of MAC RAR format 400 may be implemented by a UE 115 and a base station 105, which may be examples of corresponding devices with respect to wireless communications systems 100, 200, 201, and 202.

In some examples, as discussed with respect to FIGS. 2 and 3, a UE 115 may be configured to communicate with a base station 105 via multiple BPLs (e.g., BPL1 and BPL2). While communicating on the first BPL, UE 115 may receive one or more TA commands having a TA command size (e.g., number of bits). However, the range of timing advance values covered by a TA command for BPL1, may not be sufficient to successfully realign a misaligned transmission timing of BPL2. Thus, a TA command size may be adjusted to extend the range of timing advance values.

In some examples, a base station 105 may transmit a RAR 405 to UE 115. Base station 105 may transmit RAR 405 after receiving a RACH transmission from UE 115. In some cases, base station 105 may transmit RAR 405 after a cell change. RAR 405 may include a reserved field 415-a, which may serve to separate preceding frames or subframes from TA command 420-a, and may be set aside for future specification or implementation-specific use. RAR 405 may also include TA command 420-a, an uplink grant 425-a for subsequent uplink transmissions, and a temporary cell-radio network temporary identifier (C-RNTI) 430. TA command 420-a may have a first TA command size, comprising, for example, a maximum of 12 bits. The first TA command size may provide a range of TA values sufficient to align a BPL transmission timing after a cell change.

Figure 4B:
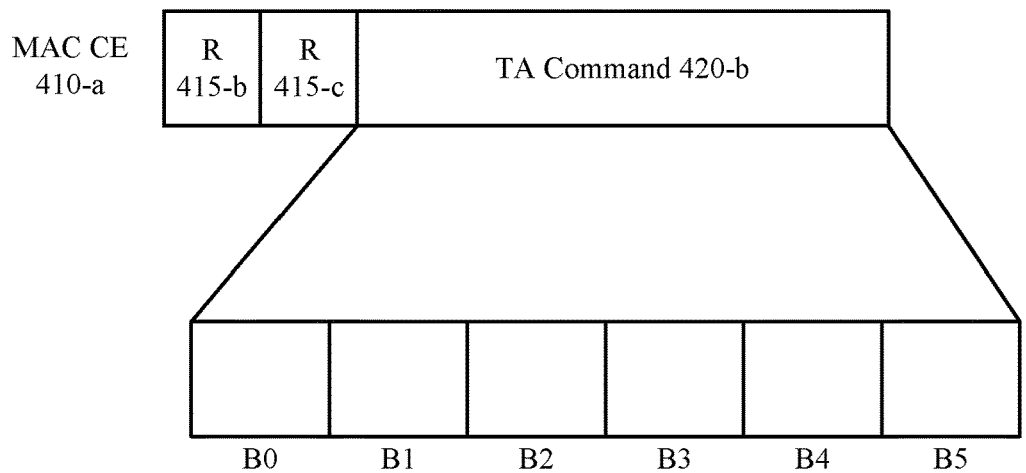
FIG. 4B illustrates an example of a MAC CE format that supports beam specific timing advance command parameters in accordance with aspects of the present disclosure.

FIG. 4B illustrates a MAC CE format 401 that supports beam specific TA parameters in accordance with various aspects of the present disclosure. In some examples, MAC CE format 401 may implement aspects of wireless communications system 100, 200, 201, and 202. Aspects of MAC CE format 401 may be implemented by a UE 115 and a base station 105, which may be examples of corresponding devices with respect to wireless communications systems 100, 200, 201, and 202.

In some examples, base station 105 may transmit a MAC CE 410-a to UE 115. MAC CE 410-a may include two reserved fields R 415-b and R 415-c, which may serve to separate preceding frames or subframes from TA command 420-b, and may be set aside for future specification or implementation-specific use. MAC CE 410-a may also carry TA command 420-b. Base station 105 may transmit MAC CE 410-a at regular time intervals (e.g., periodically) to apply a TA adjustment in response to delay spread, or other timing misalignments. TA command 420-b may have a second TA command size comprising, for example, a maximum of 6 bits. The second TA command size may provide a range of TA values sufficient to realign a BPL transmission timing resulting from, for example, delay spread, or other causes of timing misalignments. Such timing misalignments or changes in timing alignments may be small relative to the differences in RTTs between different BPLs, and may be due to small changes in UE position relative to a base station (e.g., a serving base station or other base station on which the UE is camped).

Figure 4C:
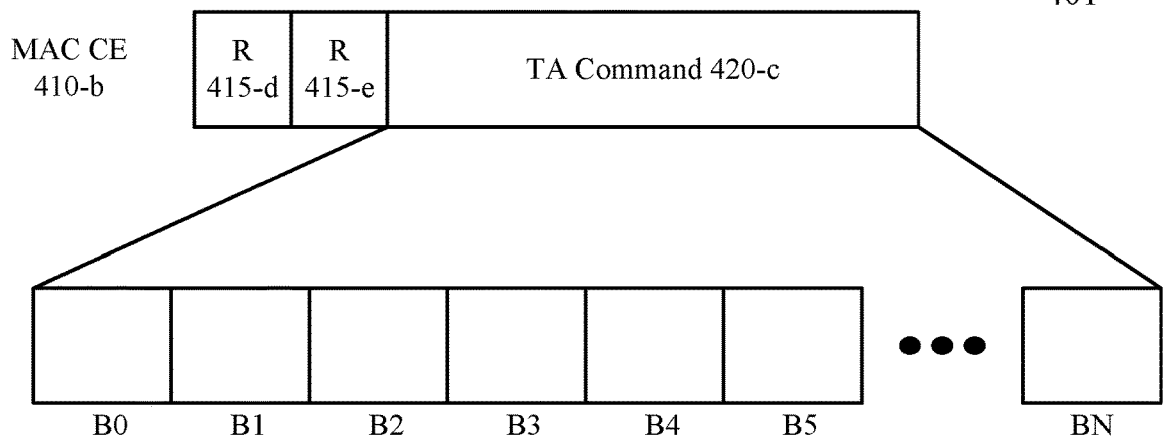
FIG. 4C illustrates an example of a MAC CE format that supports beam specific timing advance command parameters in accordance with aspects of the present disclosure.

FIG. 4C illustrates a MAC CE format that supports beam specific TA parameters in accordance with various aspects of the present disclosure. In some examples, MAC CE format 402 may implement aspects of wireless communications system 100, 200, 201, and 202. Aspects of MAC CE format 402 may be implemented by a UE 115 and a base station 105, which may be examples of corresponding devices with respect to wireless communications systems 100, 200, 201, and 202.

In some examples base station 105 may transmit MAC CE 410-b to UE 115. MAC CE 410-b may carry reserved bits R 415-d and R 415-e. Reserved bits R 415-d and R 415-e, may serve to separate preceding frames or subframes (e.g., data transmissions or MAC subheader) from TA command 420-c, and may be set aside for future specification or implementation-specific use. MAC CE 410-b may be a next MAC CE following a beam switch command. TA command 420-c may have a third TA command size comprising N bits (BN). For example, N may be greater than 6 and less than 12. Third TA command size of N bits (e.g., 9 bits, 10 bits, 11 bits, etc.) may provide a greater range of timing advance values after a beam switch command. In some examples, TA command 420-c of third TA command size may be carried in an RRC signal or DCI signal following a beam switch command. In some examples, the RRC signal may be conveyed in an RMSI signal or in an OSIB signal.

Figure 5:
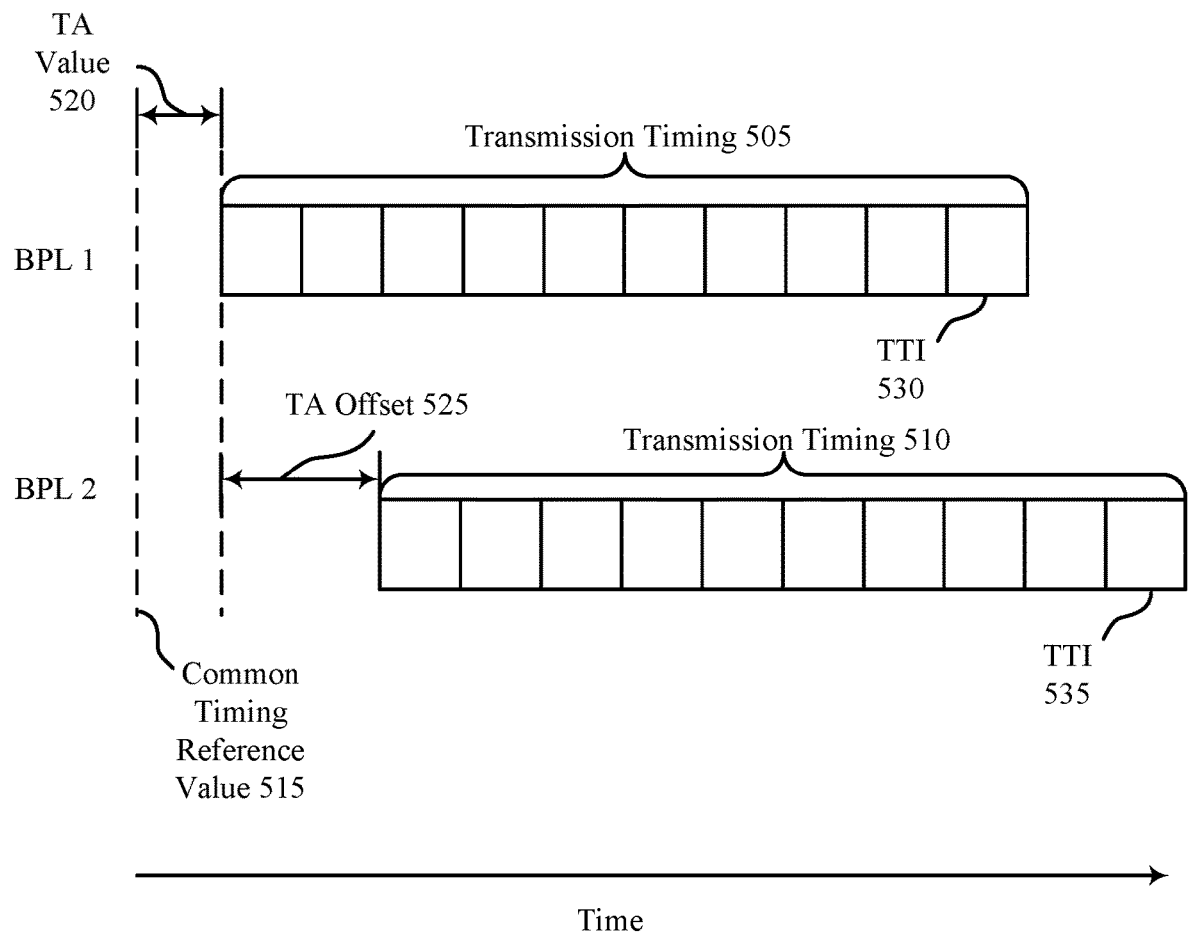
FIG. 5 illustrates an example of a timing alignment scheme that supports beam specific timing advance command parameters in accordance with aspects of the present disclosure.

FIG. 5 illustrates an example of a timing alignment scheme 500 that supports beam specific TA parameters in accordance with various aspects of the present disclosure. In some examples, timing alignment scheme 500 may implement aspects of wireless communications system 100, 200, 201, and 202. Aspects of timing alignment scheme 500 may be implemented by a UE 115 and a base station 105, which may be examples of corresponding devices with respect to wireless communications systems 100, 200, 201, and 202.

As discussed with reference to FIG. 3, in some cases a UE 115 may communicate via multiple BPLs, such as BPL1 and BPL2. As discussed with respect to FIG. 2, BPL1 and BPL2 may have different RTTs due to different physical paths, etc. Common timing reference value 515 may be based on one or more of BPL1, BPL2 or other BPLs, all of which may be included in a TAG, or across different TAGs. Transmission timing 505 and transmission timing 510 of BPL 1 and BPL2, respectively, may be adjusted to be aligned with respect to time based on common timing reference value 515.

In some examples, a TA command for BPL1 may carry a TA value 520. TA value 520 may be sufficient to realign transmission timing 505 for BPL1 to common timing reference value 515. However, because BPL2 may have a different transmission timing 510, TA value 520 may not be sufficient to successfully realign transmission timing 510. In some examples, UE 115 may send uplink transmissions on multiple BPLs (e.g., BPL1 and BPL2). However, a TA command carrying TA value 520 may not be successful during transmission made via BPL2.

Upon configuring BPL1 and BPL2, a base station 105 or a UE 115 may identify a TA offset 525 between transmission timing 505 for BPL1 and transmission timing 510 for BPL2. For example, Base station 105 may determine a difference between a RTT for transmission on BPL1 and BPL2, and may determine the TA offset 525 based on the difference. The TA offset may be applied each time UE 115 switches between BPL1 and BPL2.

For example, UE 115 may initially communicate with base station 105 via BPL1. BPL1 may have a transmission timing 505 that is misaligned by a timing gap equal to TA value 520. Base station 105 may identify the misalignment, and may transmit a TA command carrying TA value 520, which may successfully realign transmission timing 505 with respect to common timing reference value 515. In such examples, base station 105 may transmit a beam switch command to UE 115, indicating a switch from BPL1 to BPL2. In response, UE 115 may switch from BPL1 to BPL2, and may commence communications with base station 105 using transmission timing 510, which may be misaligned by a different amount of time than transmission timing 505. In one example, base station 105 may transmit a TA command that also carries TA value 520. Upon receiving the TA command, UE 115 may apply TA value 520 and may also apply TA offset 525. Thus, by applying both TA value 520 and the automatic TA offset 525, transmission timing 510 may be realigned successfully with common timing reference value 515. In another example, base station 105 may add TA offset 525 to TA value 520, and may transmit a TA command including an updated TA value that includes TA value 520 and TA offset 525. The application of an automatic TA offset 525 may be beneficial in scenarios where a UE 115 is relatively stationary or has low mobility. In some examples, a TA value may apply to the BPL (e.g., BPL2) with a transmission timing that is more misaligned (e.g., transmission timing 510), and the TA offset 525 may be subtracted from the TA value upon switching to another BPL (e.g., BPL1) with a less misaligned transmission timing (e.g., transmission timing 505).

In some cases, a UE 115 may be more mobile, and TA offset 525 may not remain the same. In such cases, base station 105 or UE 115 may keep track of how many TA commands must be sent while UE 115 communicates with base station 105 via one BPL. If the number of TA commands exceeds a threshold, then base station 105 may invalidate TA offset 525, reset TA offset 525, or reconfigure TA offset 525. For example, UE 115 may receive a beam switch command from base station 105, and may switch from communicating with base station 105 using BPL1 to communicating with base station 105 using BPL2. Initially, receiving TA value 520 and applying TA offset 525 may be sufficient to realign transmission timing 510. However, if UE 115 becomes more mobile, then transmission timing 510 may become even more misaligned, and TA offset 525 may no longer be sufficient to realign transmission timing 510. Base station 105 may determine the misalignment and may transmit a TA command including TA value 520 and UE 115 may apply TA value 520 and TA offset 525. However, the misalignment may not be resolved because of the mobility of UE 115 (e.g., UE 115 may be moving further away from or closer to base station 105, and the RTT may change, resulting in a different misalignment of transmission timing 510). Despite transmitting multiple TA commands, transmission timing 510 may remain misaligned. In such cases, base station 105 may determine that the TA offset 525 is not sufficient to realign transmission timing 510, and may reset, reconfigure, or invalidate TA offset 525. For instance, if the threshold is five TA commands, upon transmitting a fifth TA command, base station 105 may determine a new TA offset 525, and may include an indication of the new TA offset 525 in a sixth TA command that includes TA value 520.

For BPL1, one-time TA value 520 may be sufficient to align transmission timing 505 with respect to common timing reference value 515 (e.g., the difference between a desired arrival time and an actual arrival time for transmissions using BPL1 may be less than a threshold amount). In such cases, there may be no need for a TA offset. Transmission timing 510 for BPL2 may be misaligned by a different amount of time than transmission timing 505, and thus may require a different offset. A TA command may carry one-time TA value 520, and may also indicate TA offset 525 for BPL2. The combination of one-time TA value 520 and TA offset 525 may be sufficient to correctly align transmission timing 510 of BPL2 with respect to common timing reference value 515. Thus, in the case of UE 115 switching transmissions from BPL1 to BPL2, TA offset 525 may be implicitly added to or subtracted from one-time TA value 520 to align transmission timing 510 with common timing reference value 515. In the case of UE 115 switching transmissions from BPL2 to BPL1, UE 115 may disregard TA offset 525 and resume using a single one-time TA value 520 to align transmission timing 505 with common timing reference value 515.

In some examples, a UE 115 may receive one-time TA value 520 from base station 105, but may autonomously determine BPL-specific TA offset 525. UE 115 may determine BPL-specific TA offset 525 by comparing reception timing of BPLs to a reception timing of a reference BPL. For example, in a case where BPL1 is a reference BPL, UE 115 may compare a reception timing of BPL2 to BPL1, and may determine BPL-specific TA offset 525 based on the comparison. In some cases the downlink timing of a BPL may be compared against the downlink timing of a reference BPL, and the UE 115 may apply a timing offset of twice the difference for the uplink timing for the BPL.

In some examples, transmission timing 505 may have a transmission time interval (TTI) 530. In some examples, transmission timing 510 may have a TTI 535.

Figure 6:
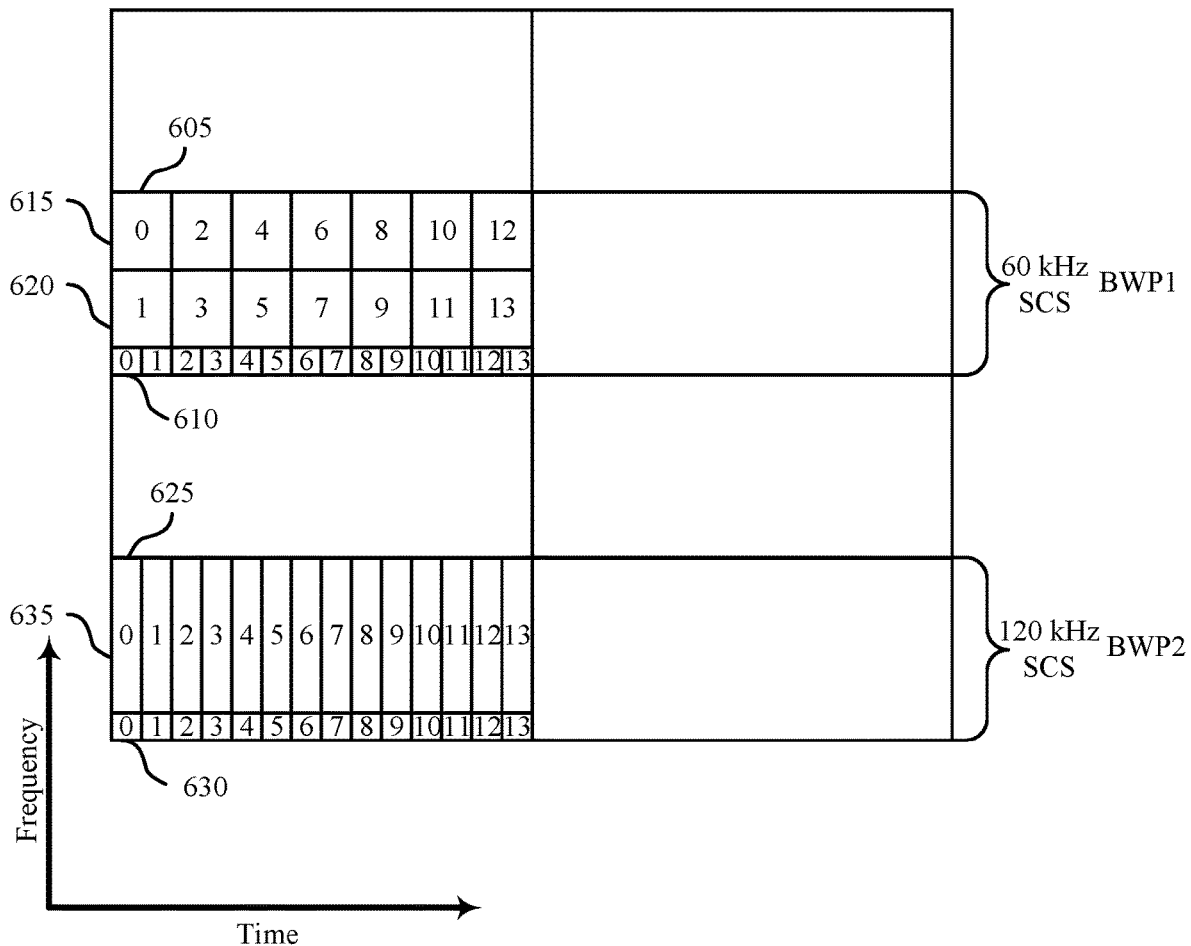
FIG. 6 illustrates an example of a BWP configuration that supports beam specific timing advance command parameters in accordance with aspects of the present disclosure.

FIG. 6 illustrates an example of a BWP configuration 600 that supports beam specific TA parameters in accordance with various aspects of the present disclosure. In some examples, BWP configuration 600 may implement aspects of wireless communications system 100, 200, 201, and 202. Aspects of BWP configuration 600 may be implemented by a UE 115 and a base station 105, which may be examples of corresponding devices with respect to wireless communications systems 100, 200, 201, and 202.

In some cases, an available bandwidth may be divided into BWPs (e.g., BWP1 and BWP2). BWP1 may comprise symbols 605 that may comprise bits 610. BWP1 may comprise a first BWP portion 615 and a second BWP portion 620, which may indicate that BWP1 features two frequency domain parts. BWP2 may comprise symbols 625 that may comprise bits 630. BWP2 may comprise a single BWP portion 635, which may indicate that BWP2 features one frequency domain part. Different BWPs may have different SCS. For example, BWP1 may have an SCS of 60 kHz, while BWP2 may have a SCS of 120 kHz. As SCS increases, a TTI (e.g., symbol period) may decrease. Thus a TA granularity for BWP2 may be less than a TA granularity for BWP1. Additionally, as discussed above with reference to FIGS. 2-5, different BPLs may have different RTTs, and a TA command may have different TA granularities for different BPLs. Thus, TA granularity may depend on both which BPL the TA command applies to, and on which BPL a UE 115 and base station 105 are scheduled to communicate.

In some examples, a base station 105 may configure a set of TA commands. Each TA command may correspond to a unique combination of BPLs and BWPs. Thus, for a base station 105 and UE 115 configured to communicate via M number of BPLs and N number of BWPs, base station 105 may configure M×N TA commands, one TA command for each combination of BPLs and BWPs. For example, if a base station 105 and a UE 115 are configured to communicate via BWP1 and BWP2, and BPL1 and BPL2 of FIG. 3 and FIG. 5, then base station 105 may configure four TA commands. Each TA command may have a corresponding TA command parameters, such as TA granularity and TA size. Base station 105 may indicate the TA command parameters of the set of TA commands via RRC signaling. In some examples, the RRC signal may be conveyed in an RMSI signal, or in an OSIB signal, or both. In such examples, a MAC CE in which a TA command is carried may also carry an indication of which TA command the MAC CE carries (e.g., via a bitmap). Alternatively, every time a base station 105 schedules a change between a first combination of BWP and BLP to a second combination of BWP and BLP, base station 105 may include an explicit indication of the TA command and corresponding TA command parameters in a next MAC CE.

In some examples, a TA command with corresponding TA command parameters may be based on a reference combination of BWPs and BPLs. For example, a combination of BPL1 and BWP1 may be selected by, for example, base station 105. BPL1 and BWP2 may be selected based on a coarseness or fineness of a current or prior TA granularity. For example, as a result of BPL1 being closely aligned to some reference transmission timing and BWP2 having a higher SCS and a lower TA granularity, the combination may have the finest TA granularity. Each subsequent TA command may include an offset from the TA parameters of the reference combination of BPLs and BWPs. For instance, a subsequent TA command include an offset from the transmission timing of the reference combination, an offset of an increase or decrease from the previous TA granularity, or an offset of an increase or a decrease from the previous TA command size.

Figure 7:
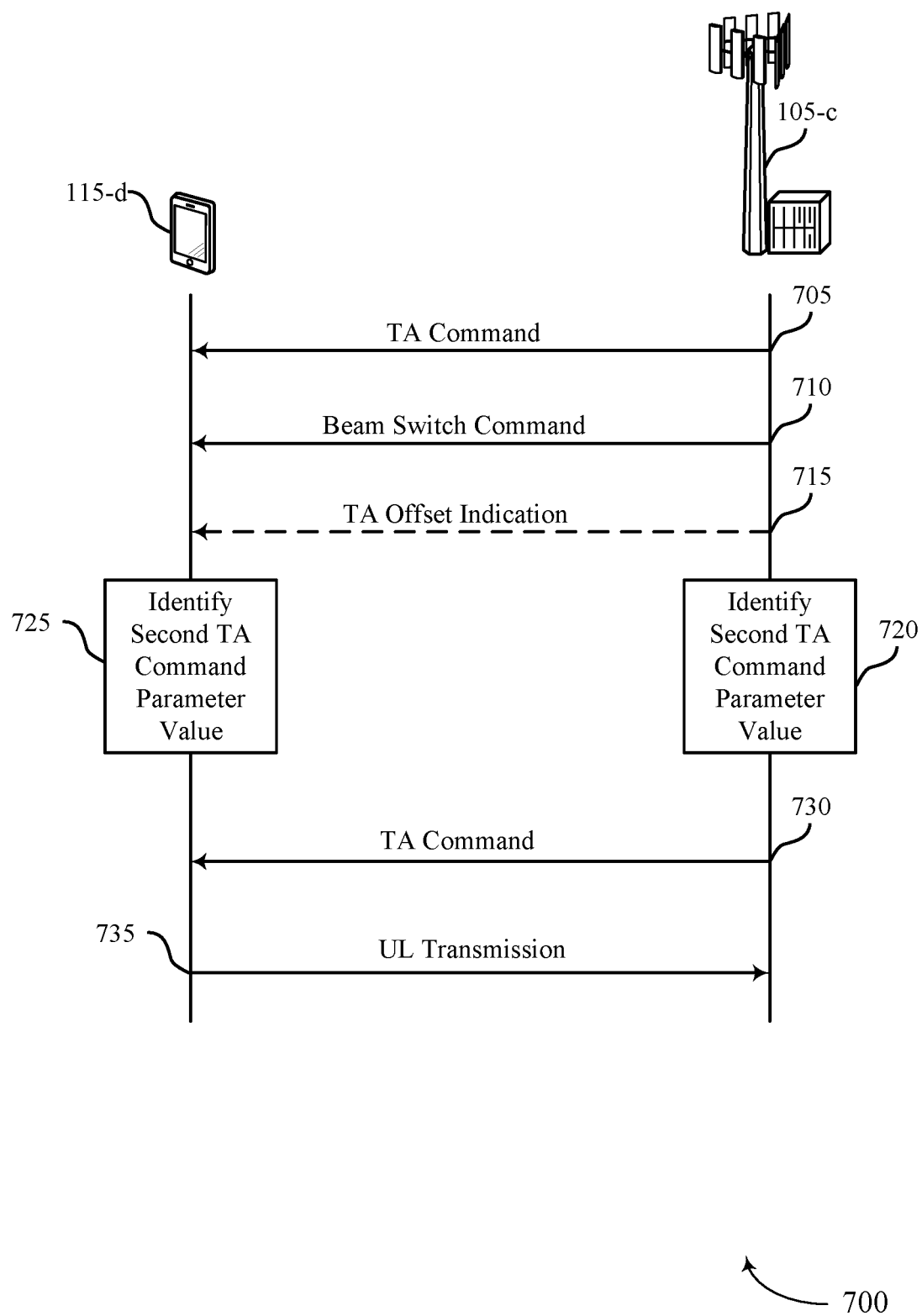
FIG. 7 illustrates an example of a process flow that supports beam specific timing advance command parameters in accordance with aspects of the present disclosure.

FIG. 7 illustrates an example of a process flow 700 that supports handling beam specific TA parameters in accordance with various aspects of the present disclosure. In some examples, process flow 700 may implement aspects of wireless communications system 100. Process flow 700 may include a first wireless node, and a second wireless node. In some examples, the first wireless node may be a UE 115, and a second wireless node may be a base station 105. In some cases, a first wireless node may be a first base station 105, and a second wireless node may be a scheduling base station 105. In some examples, a first wireless node may be a first UE 115, and a second wireless node may be a scheduling UE 115. For purpose of illustration only, the first wireless node may be referred to as UE 115-d, and the second wireless node may be referred to as base station 105-c. But, it should be understood that these are by way of example only, and that base station 105-c and UE 115-d could be examples of various wireless nodes as noted above and could be in communication with additional wireless nodes.

At 705, base station 105-c may transmit, and UE 115-d may receive, one or more TA commands for a first BPL. The one or more TA commands may be formatted according to a first value for a TA command parameter, wherein the TA parameter may comprise a TA command size or a TA granularity, or a combination thereof. Base station 105-c may transmit, and UE 115-d may receive, an indication of a first combination of TA command size and TA granularity for the first BPL.

At 710, base station 105-c may transmit, and UE 115-d may receive, a beam switch command for UE 115-d to switch from communicating with base station 105-c using the first BPL to communicating with base station 105-c using a second BPL. Base station 105-c may transmit, and UE 115-d may receive, a second indication of a second combination of TA command size and TA granularity for the second BPL. In some examples, base station 105-c may send, and UE 115-d may receive, the TA command from step 730 with the beam switch command or in a next TA command following the beam switch command. In some examples, UE 115-d may receive the TA command at step 730 and the beam switch command in the same control signal.

At 715, base station 105-c may transmit, and UE 115-d may receive, an indication of a second TA offset for the second BPL with the beam switch command. The second TA offset may be different from a first TA offset for the first BPL. In some examples, base station 105-d may compare a first RTT of the first BPL with a second RTT of the second BPL, and may determine the second TA offset based at least in part on the comparing. UE 115-d may apply the TA offset for the second BPL to an uplink transmission timing for the first wireless device based at least in part on receiving the beam switch command. UE 115-d may apply a TA value corresponding to the TA command to the uplink transmission timing. In some examples, base station 105-c may transmit, and UE 115-d may receive, an updated TA offset for the second BPL based at least in part on a number of TA commands received for the second BPL having exceeded a threshold.

In some examples, base station 105-c may transmit, and UE 115-d may receive, an indication of a second TA offset for the second BPL before the transmission of the beam switch command. Additionally or alternatively, in some examples, UE 115-d may calculate the second TA offset for the second BPL as it tracks the different BPLs. In such a case, base station 105-c may not transmit an indication of the second TA offset for the second BPL. In either or both examples, overhead may be reduced while transmitting the beam switch command.

At 720, base station 105-c may identify a second value for the TA common parameter to use for TA commands transmitted to the second wireless device following the switch.

At 725, UE 115-d may identify the second value for the TA command parameter based at least in part on the received beam switch command. The second value for the TA command parameter may comprise a first TA granularity of the received TA command. The second value for the TA command parameter may comprise a TA granularity that is more coarse than the first value for the TA command parameter of the one or more TA commands for the first BPL. In some examples, base station 105-c may transmit, and UE 115-d may receive, a media MAC CE comprising the TA command of step 730 and the second value for the TA command parameter. The TA command parameter may comprise the more coarse TA granularity.

In some examples, base station 105-c and UE 115-d may identify a third value for the TA command parameter to use for subsequent TA commands received from the second wireless device for the second BPL, wherein the subsequent TA commands may follow the received TA command. The third value for the TA command parameter may comprise a second TA granularity of the received TA command. The third value for the TA command parameter may comprise a second TA granularity that is more coarse than the first TA granularity. Base station 105-c may transmit, and UE 115-d may receive, one or more of the subsequent TA commands based at least in part on the identified third value for the TA command parameter.

At 730, base station 105-c may transmit, and UE 115-d may receive, a TA command formatted according to the identified second value for the TA command parameter. In some examples, the TA command may comprise more than six bits. In some examples, UE 115-*d* may receive the TA command and the beam switch command at step 710 in the same control signal. In other examples, UE 115-*d* may receive a TA command with the beam switch command or in a next TA command following the beam switch command.

In some examples, the received TA command may comprise an indication of a TA offset for the second BPL. The TA offset for the second BPL may be different from a TA offset for the first BPL. UE 115-*d* may apply the TA offset for the second BPL to an uplink transmission timing for the first wireless device based at least in part on receiving the beam switch command. In some examples, base station 105-*d* may compare a first RTT of the first BPL with a second RTT of the second BPL, and may determine the second TA offset based at least in part on the comparing. UE 115-*d* may apply a TA value corresponding to the TA command to the uplink transmission timing. In some examples, base station 105-*c* may transmit, and UE 115-*d* may receive, an updated TA offset for the second BPL based at least in part on a number of TA commands received for the second BPL having exceeded a threshold.

In some examples, UE 115-*d* may use TA commands for uplink transmission timing adjustment. In such a case, UE 115-*d* may identify a first TA command size, a second TA command size, and a third TA command size, wherein the identified second value for the TA command parameter may comprise one of the first TA command size, or the second TA command size, or the third TA command size. In some examples, UE 115-*d* may use the first TA command size for a first TA command that may be transmitted from base station 105-*c* in a random access response. The first TA command size may be twelve bits. UE 115-*d* may use the second TA command size in a MAC CE, or an RRC signal, or a DCI signal, or a combination thereof, each of which may be sent by base station 105-*c*. In some examples, the RRC signal may be conveyed in an RMSI signal, or in an OSIB signal, or both. The second value for the TA command parameter may comprise the second TA command size. The second TA command size may be more than six bits and less than twelve bits. UE 115-*d* may use the third TA command size for a third TA command that may be transmitted by base station 105-*c* in a MAC CE. The third TA command size may be six bits.

At 735, UE 115-*d* may transmit one or more uplink transmissions. In some examples, UE 115-*d* may apply the second TA command parameter value for the second BPL to an uplink transmission. In some examples, UE 115-*d* may apply the TA offset for the second BPL to an uplink transmission timing.

Figure 8:
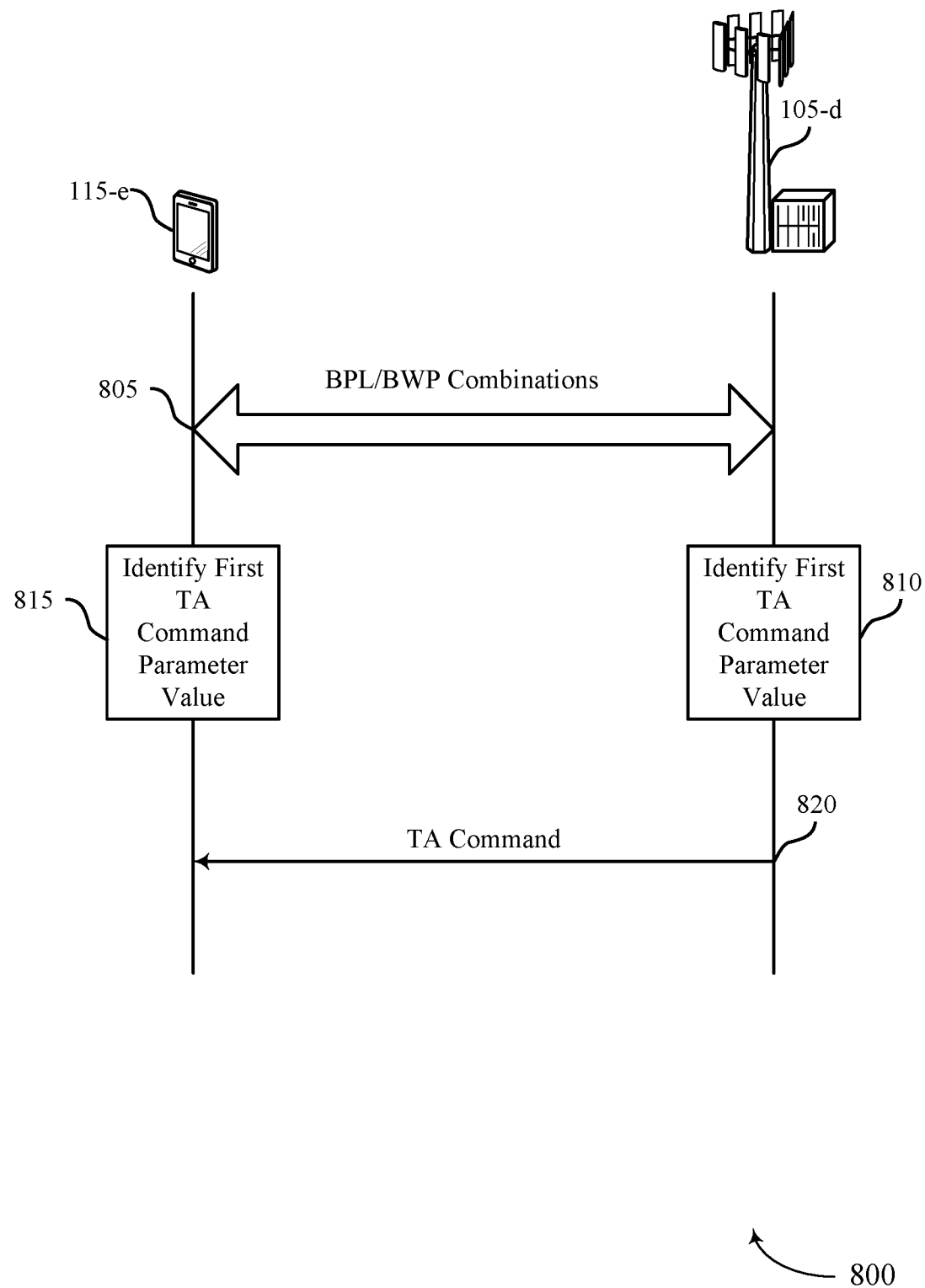
FIG. 8 illustrates an example of a process flow that supports beam specific timing advance command parameters in accordance with aspects of the present disclosure.

FIG. 8 illustrates an example of a process flow 800 that supports handling beam specific timing TA parameters in accordance with various aspects of the present disclosure. In some examples, process flow 800 may implement aspects of wireless communications system 100. Process flow 800 may include a first wireless node, and a second wireless node. In some examples, the first wireless node may be a UE 115, and a second wireless node may be a base station 105. In some cases, a first wireless node may be a first base station 105, and a second wireless node may be a scheduling base station 105. In some examples, a first wireless node may be a first UE 115, and a second wireless node may be a scheduling UE 115. For purpose of illustration only, the first wireless node may be referred to as UE 115-*e*, and the second wireless node may be referred to as base station 105-*d*. But, it should be understood that these are by way of example only, and that base station 105-*d* and UE 115-*e* could be examples of various wireless nodes as noted above and could be in communication with additional wireless nodes.

At 805, UE 115-*e* and base station 105-*d* may communicate using a plurality of combinations of BPLs and bandwidth parts (BWPs). In some examples, at least two BWPs may have different subcarrier spacings.

At 810, base station 105-*d* may identify a first value for a TA command parameter for TA commands transmitted to UE 115-*e* for a first combination of a first BPL and a first BWP. The first value for the TA command parameter may be one of a plurality of values for the TA command parameter. Each of the plurality of values for the TA command parameter may correspond to one or more of the plurality of combinations of BPLs and BWPs.

At 815, UE 115-*e* may identify a first value for a TA command parameter for TA commands transmitted to UE 115-*e* for a first combination of a first BPL and a first BWP. The first value for the TA command parameter may be one of a plurality of values for the TA command parameter. Each of the plurality of values for the TA command parameter may correspond to one or more of the plurality of combinations of BPLs and BWPs. The TA command parameter may include a TA command size, or a TA granularity, or a TA offset, or a combination thereof. Each of the plurality of values for the TA command parameter may correspond to a respective one combination of the plurality of combinations of BPLs and BWPs. In some examples, base station 105-*d* may transmit, and UE 115-*e* may receive, an RRC signal, or a MAC CE, or a DCI signal, or a combination thereof, that comprises an indication of the first value for the TA command parameter. In some examples, the RRC signal may be conveyed in an RMSI signal or in an OSIB signal.

In some examples, base station 105-*d* may transmit, and UE 115-*e* may receive, an indication of a reference value for the TA command parameter. Identifying the first value for the TA command parameter may be based at least in part on the indication of the reference value for the TA command parameter. In other examples, base station 105-*d* and UE 115-*e* may identify a reference combination of the plurality of combinations of BPLs and BWPs, and may identify the first value for the TA command parameter based at least in part on the identified reference combination. Base station 105-*d* and UE 115-*e* may identify a value for one or more additional TA command parameters based at least in part on the identified reference combination. Base station 105-*d* and UE 115-*e* may identify the reference combination based at least in part on a TA granularity for the reference combination, wherein the TA command parameter comprises the TA granularity.

In some examples, as shown at 805, base station 105-*d* may communicate with or be configured to communicate with UE 115-*e* using more than one BPL/BWP pair. For example, a first BPL/BWP pair may comprise a first BPL (BPL1) using a first BWP (BWP1), and a second BPL/BWP pair may comprise a second BPL (BPL2) using a second BWP (BWP2). In some examples, the first BPL/BWP pair may be associated with a first TA parameter, and the second BPL/BWP pair may be associated with a second TA parameter. In such a case, the first TA parameter may be different than the second TA parameter. In some examples, as shown at 810 and 815, base station 105-*d* and UE 115-*e* may identify the first TA parameter when communicating with the first BPL/BWP pair, and may use the second TA parameter when communicating with the second BPL/BWP pair.

In some examples, UE 115-*e* may communicate with base station 105-*d* via only one BPL/BWP pair at a time, and may autonomously select or receive an indication of which TA parameter to utilize, based on the BPL/BWP pair currently being used. However, in some examples, UE 115-*e* may concurrently use multiple BPL/BWP pairs (e.g., first BPL/BWP pair and second BPL/BWP pair) to communicate with 105-*d*. In such examples, UE 115-*e* may use different TA parameters (e.g., the first TA parameter and the second TA parameter) while communicating on both BPL/BWP pairs. In some examples, base station 105-*d* may inform UE 115-*e* of which TA parameter to use when communicating with a BPL/BWP pair. For example, base station 105-*d* may inform UE 115-*e* to use the first TA parameter when communicating with the first BPL/BWP pair and use the second TA parameter when communicating with the second BPL/BWP pair. In another example, base station 105-*d* may inform UE 115-*e* to use the second TA parameter when communicating with the second BPL/BWP pair and use the first TA parameter when communicating with the second BPL/BWP pair. In some examples, base station 105-*d* may indicate which of the TA parameters to utilize when communicating via both BPL/BWP pairs. For example, base station 105-*d* may indicate to UE 115-*e* to utilize the first TA parameter while communicating on both the first and the second BPL/BWP pairs.

In some examples, a BPL/BWP pair may be designated as a default BPL/BWP pair that determines the TA parameters for the other pairs. In some examples, the BPL/BWP pair with the lowest or highest subcarrier spacing among the concurrently-activated or configured BPL/BWP pairs may be designated as the default BPL/BWP pair. For example, base station 105-*d* and UE 115-*e* may communicate using the first BPL/BWP pair and the second BPL/BWP pair. The first BPL/BWP pair may have a lower subcarrier spacing than the second BPL/BWP pair, and thus the first BPL/BWP pair may be designated as the default BPL/BWP pair. In such a case, the first TA parameter (which is associated with the first BPL/BWP pair) may be applied to both the first BPL/BWP pair and the second BPL/BWP pair while the respective BPL/BWP pairs are being used.

At 820, base station 105-*d* may transmit, and UE 115-*e* may receive, a TA command for the first BPL. The TA command may be based at least in part on the identified first value for the TA command parameter.

Figure 9:
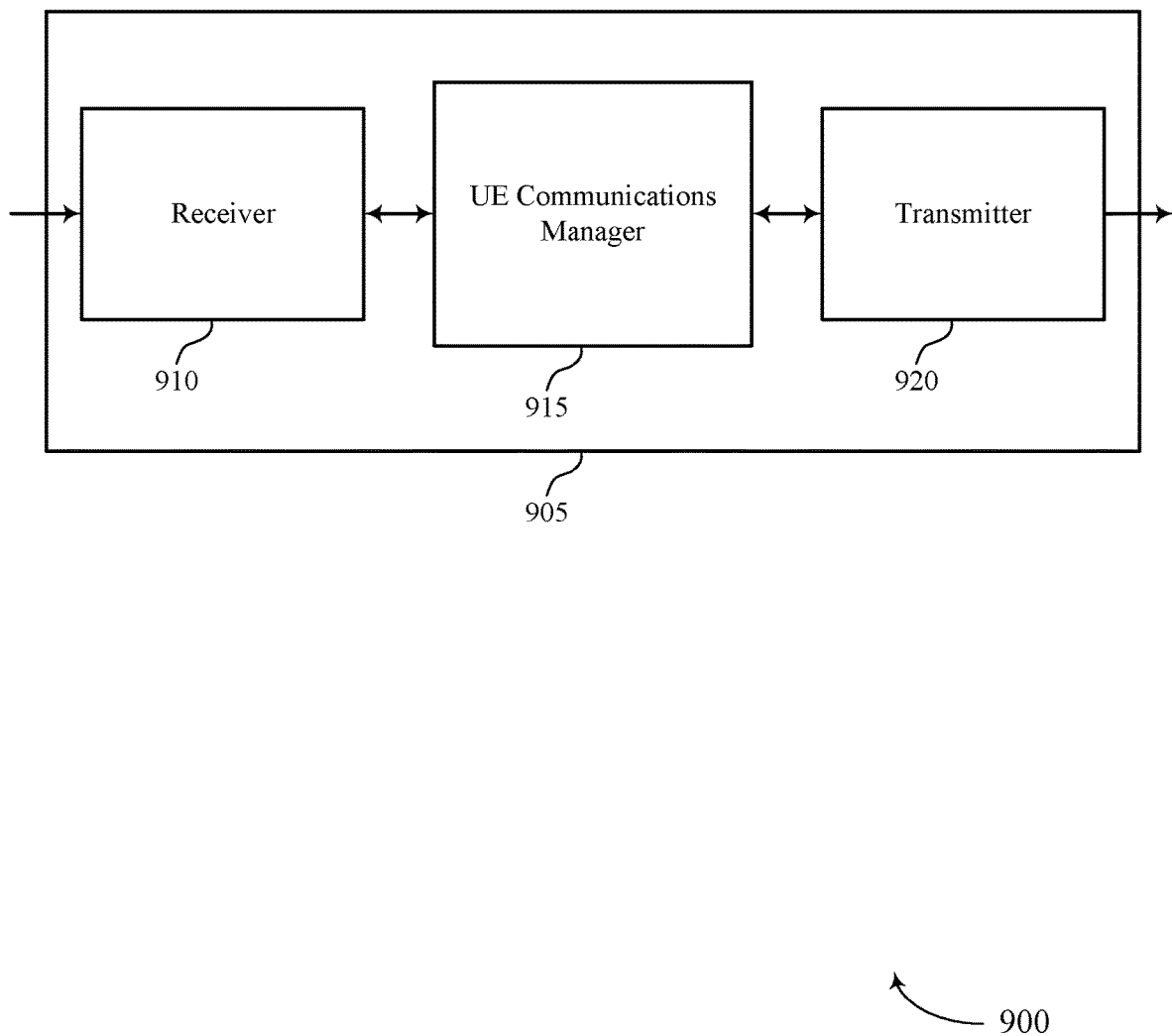
FIGS. 9 through 11 show block diagrams of a device that supports beam specific timing advance command parameters in accordance with aspects of the present disclosure.

FIG. 9 shows a block diagram 900 of a wireless device 905 that supports beam specific timing advance command parameters in accordance with aspects of the present disclosure. Wireless device 905 may be an example of aspects of a user equipment (UE) 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to beam specific timing advance command parameters, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive, from a second wireless device, one or more TA commands for a first beam pair link (BPL), the one or more TA commands formatted according to a first value for a TA command parameter, receive a beam switch command for the first wireless device to switch from communicating with the second wireless device using the first BPL to communicating with the second wireless device using a second BPL, identify a second value for the TA command parameter based on the received beam switch command, and receive, from the second wireless device, a TA command formatted according to the identified second value for the TA command parameter. The UE communications manager 915 may also communicate with a second wireless device using a set of combinations of BPLs and BWPs, identify a first value for a TA command parameter for TA commands received from the second wireless device for a first combination of a first BPL and a first BWP, the first value for the TA command parameter one of a set of values for the TA command parameter, each of the set of values for the TA command parameter corresponding to one or more of the set of combinations of BPLs and BWPs, and receive, from the second wireless device, a TA command for the first BPL based on the identified first value for the TA command parameter.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
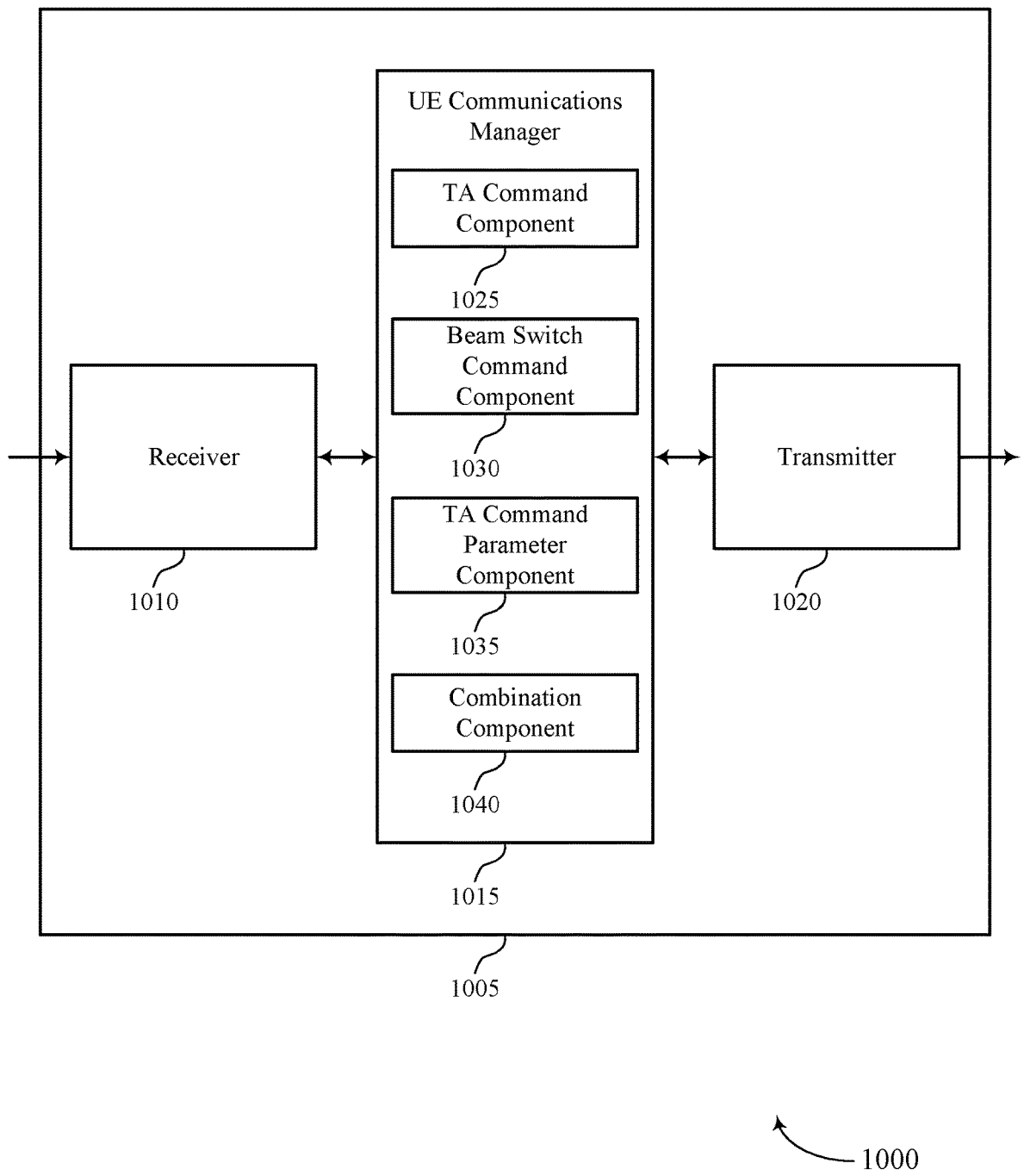

FIG. 10 shows a block diagram 1000 of a wireless device 1005 that supports beam specific timing advance command parameters in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to beam specific timing advance command parameters, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12.

UE communications manager 1015 may also include TA command component 1025, beam switch command component 1030, TA command parameter component 1035, and combination component 1040.

TA command component 1025 may receive, from a second wireless device, one or more TA commands for a first BPL, the one or more TA commands formatted according to a first value for a TA command parameter, receive, from the second wireless device, a TA command formatted according to the identified second value for the TA command parameter, apply a TA value corresponding to the TA command to the uplink transmission timing, receive a DCI signal, or a MAC CE, or an (RRC signal, or a combination thereof, including the TA command, or the second value for the TA command parameter, or a combination thereof, and receive, from the second wireless device, a TA command for the first BPL based on the identified first value for the TA command parameter. In some examples, the RRC signal may be conveyed in an RMSI signal or in an OSIB signal. In some cases, the TA command and the beam switch command are received in a same control signal.

Beam switch command component 1030 may receive a beam switch command for the first wireless device to switch from communicating with the second wireless device using the first BPL to communicating with the second wireless device using a second BPL. In some cases, receiving the TA command includes: receiving the TA command with the beam switch command or in a next TA command following the beam switch command.

TA command parameter component 1035 may identify a second value for the TA command parameter based on the received beam switch command, identify a third value for the TA command parameter to use for subsequent TA commands received from the second wireless device for the second BPL, the subsequent TA commands following the received TA command, receive one or more of the subsequent TA commands based on the identified third value for the TA command parameter, identify a first value for a TA command parameter for TA commands received from the second wireless device for a first combination of a first BPL and a first BWP, the first value for the TA command parameter one of a set of values for the TA command parameter, each of the set of values for the TA command parameter corresponding to one or more of the set of combinations of BPLs and BWPs, and receive a DCI signal, or a RRC signal, or a MAC CE, or a combination thereof, that includes an indication of the first value for the TA command parameter. In some cases, the TA command parameter includes a TA command size, or a TA granularity, or a combination thereof. In some cases, the TA command parameter includes a TA command size, or a TA granularity, or a TA offset, or a combination thereof.

Combination component 1040 may receive a first indication of a first combination of TA command size and TA granularity for the first BPL, receive a second indication of a second combination of TA command size and TA granularity for the second BPL, and communicate with a second wireless device using a set of combinations of beam pair links (BPLs) and BWPs. In some cases, each of the set of values for the TA command parameter corresponds to a respective one combination of the set of combinations of BPLs and BWPs.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
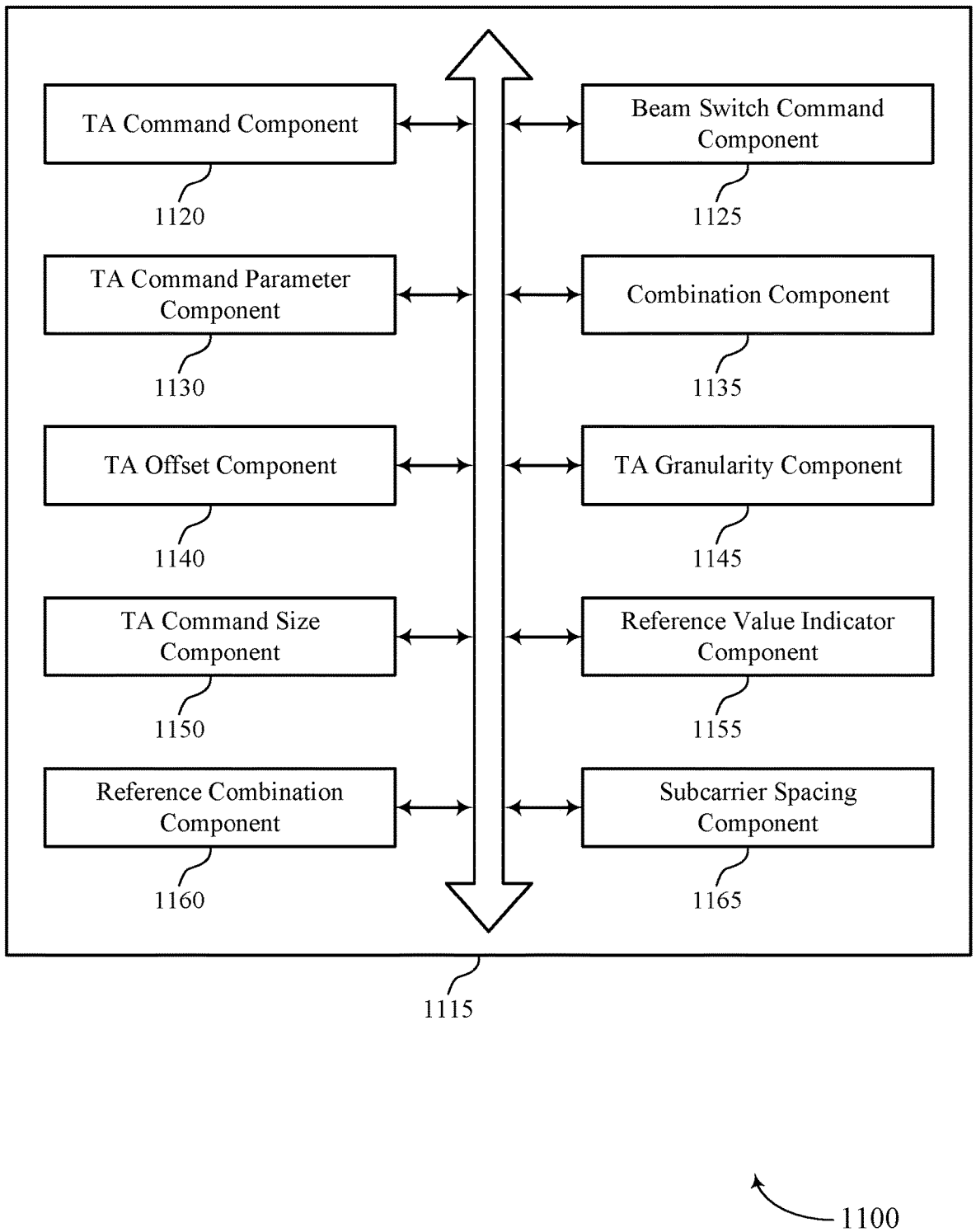

FIG. 11 shows a block diagram 1100 of a UE communications manager 1115 that supports beam specific timing advance command parameters in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include TA command component 1120, beam switch command component 1125, TA command parameter component 1130, combination component 1135, TA offset component 1140, TA granularity component 1145, TA command size component 1150, reference value indicator component 1155, reference combination component 1160, and subcarrier spacing component 1165. Each of these modules may communicate, directly or indirectly, with one another (e.g., via one or more buses).

TA command component 1120 may receive, from a second wireless device, one or more TA commands for a first BPL, the one or more TA commands formatted according to a first value for a TA command parameter, receive, from the second wireless device, a TA command formatted according to the identified second value for the TA command parameter, apply a TA value corresponding to the TA command to the uplink transmission timing, receive a DCI signal, or a MAC CE, or a RRC signal, or a combination thereof, including the TA command, or the second value for the TA command parameter, or a combination thereof, and receive, from the second wireless device, a TA command for the first BPL based on the identified first value for the TA command parameter. In some examples, the RRC signal may be conveyed in an RMSI signal, or in an OSIB signal, or both. In some cases, the TA command and the beam switch command are received in a same control signal.

Beam switch command component 1125 may receive a beam switch command for the first wireless device to switch from communicating with the second wireless device using the first BPL to communicating with the second wireless device using a second BPL. In some cases, receiving the TA command includes: receiving the TA command with the beam switch command or in a next TA command following the beam switch command.

TA command parameter component 1130 may identify a second value for the TA command parameter based on the received beam switch command, identify a third value for the TA command parameter to use for subsequent TA commands received from the second wireless device for the second BPL, the subsequent TA commands following the received TA command, receive one or more of the subsequent TA commands based on the identified third value for the TA command parameter, identify a first value for a TA command parameter for TA commands received from the second wireless device for a first combination of a first BPL and a first BWP, the first value for the TA command parameter one of a set of values for the TA command parameter, each of the set of values for the TA command parameter corresponding to one or more of the set of combinations of BPLs and BWPs, and receive a DCI signal, or a RRC signal, or a MAC CE, or a combination thereof, that includes an indication of the first value for the TA command parameter. In some examples, the RRC signal may be conveyed in an RMSI signal, or in an OSIB signal, or both. In some cases, the TA command parameter includes a TA command size, or a TA granularity, or a combination thereof. In some cases, the TA command parameter includes a TA command size, or a TA granularity, or a TA offset, or a combination thereof.

Combination component 1135 may receive a first indication of a first combination of TA command size and TA granularity for the first BPL, receive a second indication of a second combination of TA command size and TA granularity for the second BPL, and communicate with a second wireless device using a set of combinations of BPLs and BWPs. In some cases, each of the set of values for the TA command parameter corresponds to a respective one combination of the set of combinations of BPLs and BWPs.

TA offset component 1140 may receive an indication of a second TA offset for the second BPL, the second TA offset different from a first TA offset for the first BPL, apply the second TA offset to an uplink transmission timing for the first wireless device based on receiving the beam switch command, and receive an updated TA offset for the second BPL based on a number of TA commands received for the second BPL having exceeded a threshold. In some cases, the received TA command includes the indication of the second TA offset.

TA granularity component 1145 may determine that the second value for the TA command parameter includes a TA granularity that is coarser or finer than the first value for the TA command parameter of the one or more TA commands for the first BPL. In some cases, the second value for the TA command parameter includes a first TA granularity of the received TA command. In some cases, the third value for the TA command parameter includes a second TA granularity that is coarser or finer than the first TA granularity.

TA command size component 1150 may identify, for TA commands used for uplink transmission timing adjustment, a first TA command size, a second TA command size, and a third TA command size, where the identified second value for the TA command parameter includes one of the first TA command size, or the second TA command size, or the third TA command size. In some cases, the received TA command includes more than six bits. In some cases, the first TA command size is used for a first TA command in a random access response. In some cases, the second TA command size is used for a second TA command in a MAC CE, or a RRC signal, or a DCI signal, or a combination thereof, and the second value for the TA command parameter includes the second TA command size. In some examples, the RRC signal may be conveyed in an RMSI signal or in an OSIB signal. In some cases, the third TA command size is used for a third TA command in a MAC CE. In some cases, the first TA command size is twelve bits. In some cases, the second TA command size is more than six bits and less than twelve bits. In some cases, the third TA command size is six bits.

Reference value indicator component 1155 may identify the first value for the TA command parameter based on the indication of the reference value for the TA command parameter. In some cases, identifying the first value for the TA command parameter further includes: receiving an indication of a reference value for the TA command parameter.

Reference combination component 1160 may identify the first value for the TA command parameter based on the identified reference combination, identify a value for one or more additional TA command parameters based on the identified reference combination, and identify the reference combination is based on a TA granularity for the reference combination, where the TA command parameter includes the TA granularity. In some cases, identifying the first value for the TA command parameter further includes: identifying a reference combination of the set of combinations of BPLs and BWPs.

Subcarrier spacing component 1165 may identify that at least two of the BWPs have different subcarrier spacings.

Figure 12:
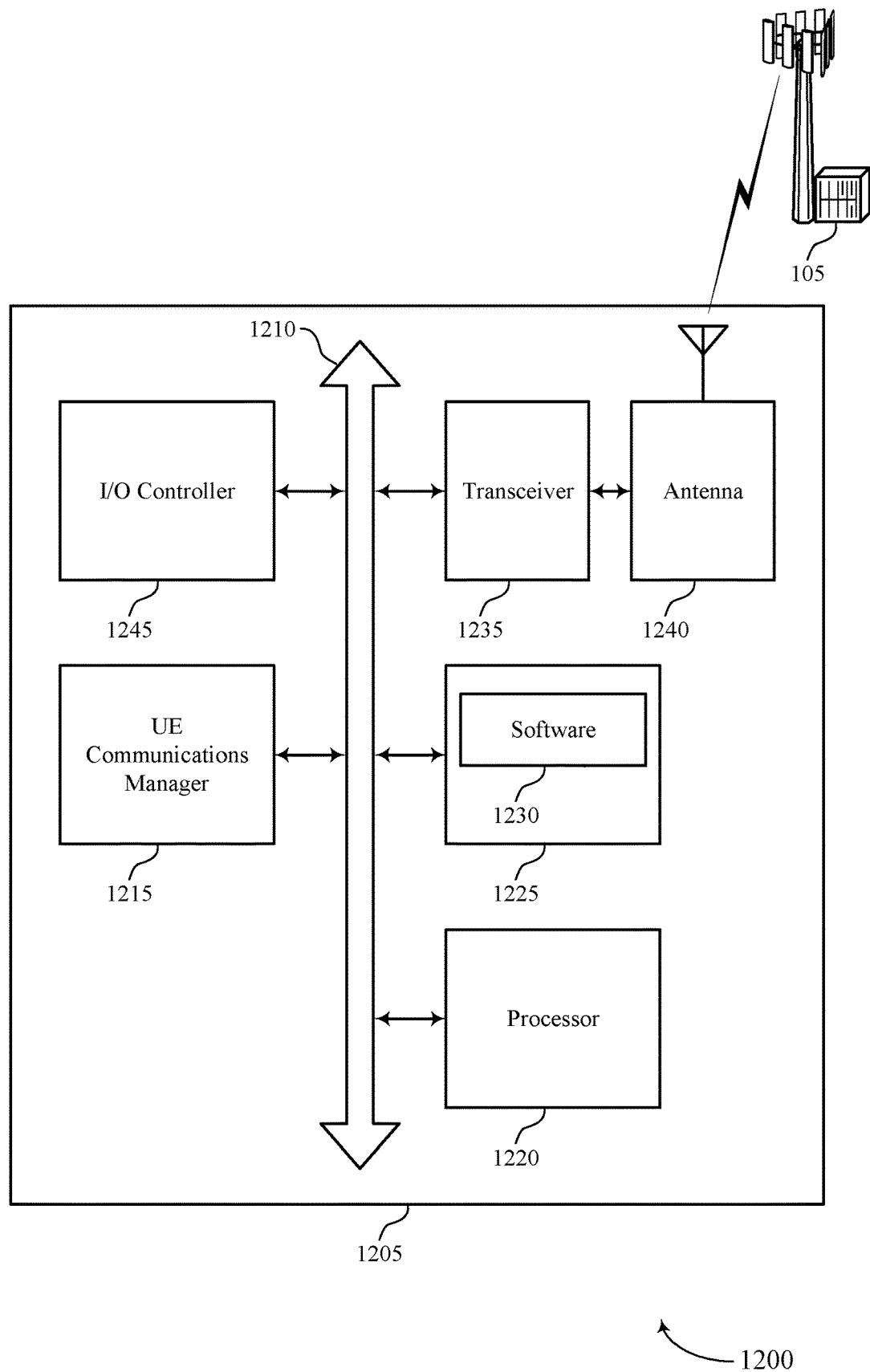
FIG. 12 illustrates a block diagram of a system including a UE that supports beam specific timing advance command parameters in accordance with aspects of the present disclosure.

FIG. 12 shows a diagram of a system 1200 including a device 1205 that supports beam specific timing advance command parameters in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting beam specific timing advance command parameters).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support beam specific timing advance command parameters. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
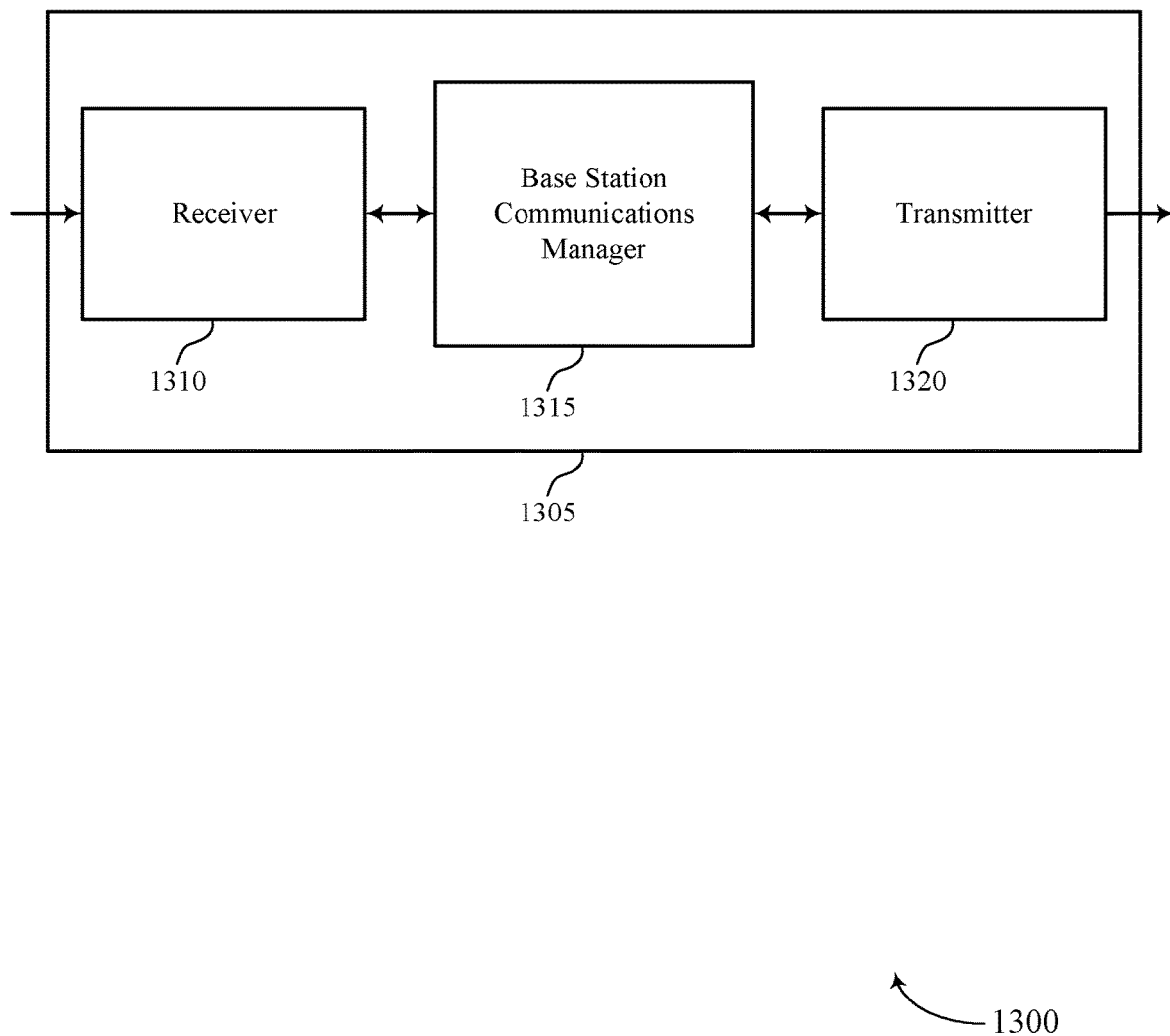
FIGS. 13 through 15 show block diagrams of a device that supports beam specific timing advance command parameters in accordance with aspects of the present disclosure.

FIG. 13 shows a block diagram 1300 of a wireless device 1305 that supports beam specific timing advance command parameters in accordance with aspects of the present disclosure. Wireless device 1305 may be an example of aspects of a base station 105 as described herein. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to beam specific timing advance command parameters, etc.). Information may be passed on to other components of the device. The receiver 1310 may be an example of aspects of the transceiver 1635 described with reference to FIG. 16. The receiver 1310 may utilize a single antenna or a set of antennas.

Base station communications manager 1315 may be an example of aspects of the base station communications manager 1615 described with reference to FIG. 16.

Base station communications manager 1315 and/or at least some of its various sub-components may be implemented in hardware, software executed by a processor, firmware, or any combination thereof. If implemented in software executed by a processor, the functions of the base station communications manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1315 and/or at least some of its various sub-components may be physically located at various positions, including being distributed such that portions of functions are implemented at different physical locations by one or more physical devices. In some examples, base station communications manager 1315 and/or at least some of its various sub-components may be a separate and distinct component in accordance with various aspects of the present disclosure. In other examples, base station communications manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may transmit, to a second wireless device, one or more TA commands for a first BPL, the one or more TA commands formatted according to a first value for a TA command parameter, transmit a beam switch command, the beam switch command for the first wireless device to switch from communicating with the second wireless device using the first BPL to communicating with the second wireless device using a second BPL, identify a second value for the TA command parameter to use for TA commands transmitted to the second wireless device following the switch, and transmit, to the second wireless device, a TA command formatted according to the identified second value for the TA command parameter. The base station communications manager 1315 may also communicate with a second wireless device using a set of combinations of BPLs and BWPs, identify a first value for a TA command parameter for TA commands transmitted to the second wireless device for a first combination of a first BPL and a first BWP, the first value for the TA command parameter one of a set of values for the TA command parameter, each of the set of values for the TA command parameter corresponding to one or more of the set of combinations of BPLs and BWPs, and transmit, to the second wireless device, a TA command for the first BPL based on the identified first value for the TA command parameter.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
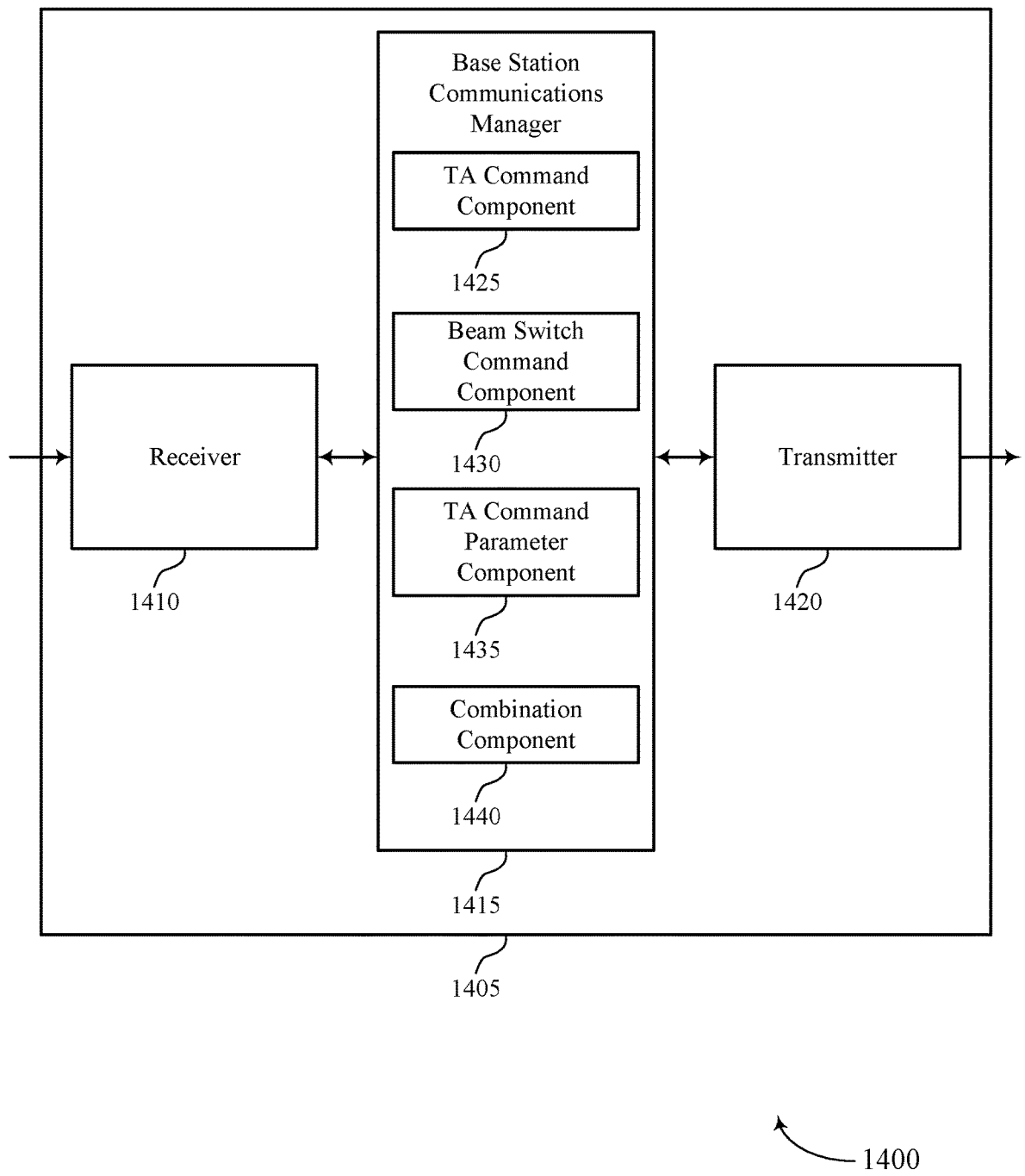

FIG. 14 shows a block diagram 1400 of a wireless device 1405 that supports beam specific timing advance command parameters in accordance with aspects of the present disclosure. Wireless device 1405 may be an example of aspects of a wireless device 1305 or a base station 105 as described with reference to FIG. 13. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to beam specific timing advance command parameters, etc.). Information may be passed on to other components of the device. The receiver 1410 may be an example of aspects of the transceiver 1635 described with reference to FIG. 16. The receiver 1410 may utilize a single antenna or a set of antennas.

Base station communications manager 1415 may be an example of aspects of the base station communications manager 1615 described with reference to FIG. 16.

Base station communications manager 1415 may also include TA command component 1425, beam switch command component 1430, TA command parameter component 1435, and combination component 1440.

TA command component 1425 may transmit, to a second wireless device, one or more TA commands for a first BPL, the one or more TA commands formatted according to a first value for a TA command parameter, transmit, to the second wireless device, a TA command formatted according to the identified second value for the TA command parameter, transmit, to the second wireless device, a TA command for the first BPL based on the identified first value for the TA command parameter, and transmit a DCI signal, or a RRC signal, or a MAC CE, or a combination thereof, that includes an indication of the first value for the TA command parameter. In some examples, the RRC signal may be conveyed in an RMSI signal or in an OSIB signal.

Beam switch command component 1430 may transmit a beam switch command, the beam switch command for the first wireless device to switch from communicating with the second wireless device using the first BPL to communicating with the second wireless device using a second BPL. In some cases, transmitting the TA command includes: transmitting the TA command with the beam switch command or in a next TA command following the beam switch command.

TA command parameter component 1435 may identify a second value for the TA command parameter to use for TA commands transmitted to the second wireless device following the switch and identify a first value for a TA command parameter for TA commands transmitted to the second wireless device for a first combination of a first BPL and a first BWP, the first value for the TA command parameter one of a set of values for the TA command parameter, each of the set of values for the TA command parameter corresponding to one or more of the set of combinations of BPLs and BWPs. In some cases, the TA command parameter includes a TA command size, or a TA granularity, or a combination thereof. In some cases, the TA command parameter includes a TA command size, or a TA granularity, or a TA offset, or a combination thereof.

Combination component 1440 may transmit a first indication of a first combination of TA command size and TA granularity for the first BPL, transmit a second indication of a second combination of TA command size and TA granularity for the second BPL, and communicate with a second wireless device using a set of combinations of BPLs and BWPs. In some cases, each of the set of values for the TA command parameter corresponds to a respective one combination of the set of combinations of BPLs and BWPs.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
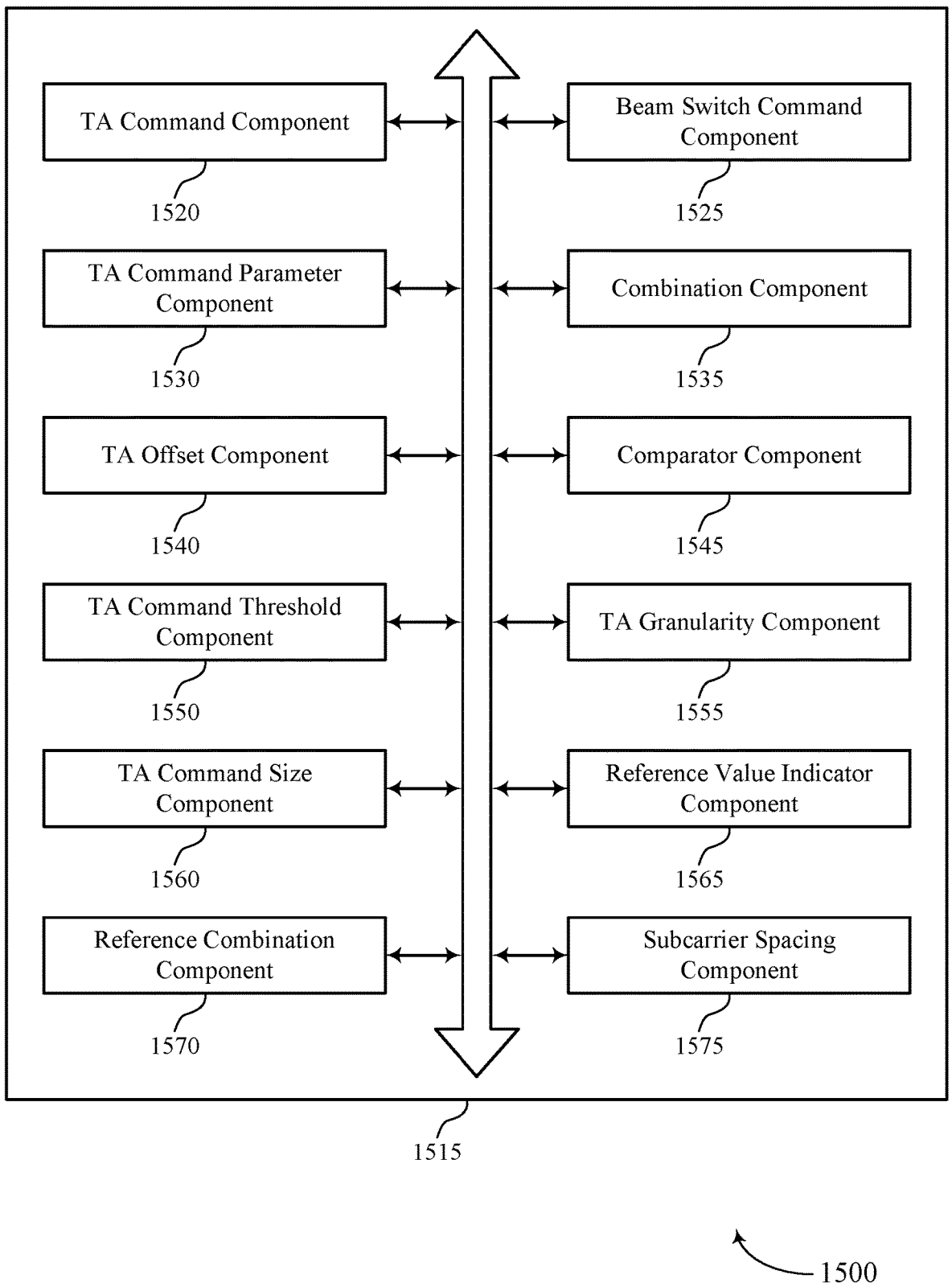

FIG. 15 shows a block diagram 1500 of a base station communications manager 1515 that supports beam specific timing advance command parameters in accordance with aspects of the present disclosure. The base station communications manager 1515 may be an example of aspects of a base station communications manager 1615 described with reference to FIGS. 13, 14, and 16. The base station communications manager 1515 may include TA command component 1520, beam switch command component 1525, TA command parameter component 1530, combination component 1535, TA offset component 1540, comparator component 1545, TA command threshold component 1550, TA granularity component 1555, TA command size component 1560, reference value indicator component 1565, reference combination component 1570, and subcarrier spacing component 1575. Each of these modules may communicate, directly or indirectly, with one another (e.g., via one or more buses).

TA command component 1520 may transmit, to a second wireless device, one or more TA commands for a first BPL, the one or more TA commands formatted according to a first value for a TA command parameter, transmit, to the second wireless device, a TA command formatted according to the identified second value for the TA command parameter, transmit, to the second wireless device, a TA command for the first BPL based on the identified first value for the TA command parameter, and transmit a DCI signal, or a RRC signal, or a MAC CE, or a combination thereof, that includes an indication of the first value for the TA command parameter. In some examples, the RRC signal may be conveyed in an RMSI signal or in an OSIB signal.

Beam switch command component 1525 may transmit a beam switch command, the beam switch command for the first wireless device to switch from communicating with the second wireless device using the first BPL to communicating with the second wireless device using a second BPL. In some cases, transmitting the TA command includes: transmitting the TA command with the beam switch command or in a next TA command following the beam switch command.

TA command parameter component 1530 may identify a second value for the TA command parameter to use for TA commands transmitted to the second wireless device following the switch and identify a first value for a TA command parameter for TA commands transmitted to the second wireless device for a first combination of a first BPL and a first BWP, the first value for the TA command parameter one of a set of values for the TA command parameter, each of the set of values for the TA command parameter corresponding to one or more of the set of combinations of BPLs and BWPs. In some cases, the TA command parameter includes a TA command size, or a TA granularity, or a combination thereof. In some cases, the TA command parameter includes a TA command size, or a TA granularity, or a TA offset, or a combination thereof.

Combination component 1535 may transmit a first indication of a first combination of TA command size and TA granularity for the first BPL, transmit a second indication of a second combination of TA command size and TA granularity for the second BPL, and communicate with a second wireless device using a set of combinations of BPLs and BWPs. In some cases, each of the set of values for the TA command parameter corresponds to a respective one combination of the set of combinations of BPLs and BWPs.

TA offset component 1540 may transmit an indication of a second TA offset for the second BPL to the second wireless device, the second TA offset different from a first TA offset for the first BPL and determine the second TA offset based on the comparing.

Comparator component 1545 may compare a first round trip time (RTT) of the first BPL with a second RTT of the second BPL.

TA command threshold component 1550 may determine that a number of TA commands transmitted for the second BPL exceeds a threshold and transmit an updated TA offset for the second BPL based on the determining.

TA granularity component 1555 may transmit a DCI signal, or a RRC signal, or a MAC CE, or a combination thereof, including the TA command, or the TA command parameter, or a combination thereof, where the TA command parameter includes a TA granularity, identify a third value for the TA command parameter to use for subsequent TA commands transmitted to the second wireless device for the second BPL following the transmitted TA command, and transmit one or more of the subsequent TA commands based on the identified third value for the TA command parameter.

In some examples, the RRC signal may be conveyed in an RMSI signal, or in an OSIB signal, or both. In some cases, the TA granularity is coarser or finer than a previous TA granularity of a previous TA command transmitted by the first wireless device for the first BPL.

TA command size component 1560 may transmit the one or more TA commands for the first BPL formatted according to a first TA command size, transmit the TA command for the second BPL formatted according to a second TA command size, the identified second value for the TA command parameter including the second TA command size, and transmit a third TA command formatted according to a third TA command size.

Reference value indicator component 1565 may identify the first value for the TA command parameter based on the indication of the reference value for the TA command parameter. In some cases, identifying the first value for the TA command parameter further includes: transmitting an indication of a reference value for the TA command parameter.

Reference combination component 1570 may identify the first value for the TA command parameter based on the identified reference combination, identify a value for one or more additional TA command parameters based on the identified reference combination, and identify the reference combination is based on a TA granularity for the reference combination, where the TA command parameter includes the TA granularity. In some cases, identifying the first value for the TA command parameter further includes: identifying a reference combination of the set of combinations of BPLs and BWPs.

Subcarrier spacing component 1575 may identify that at least two of the BWPs have different subcarrier spacings.

Figure 16:
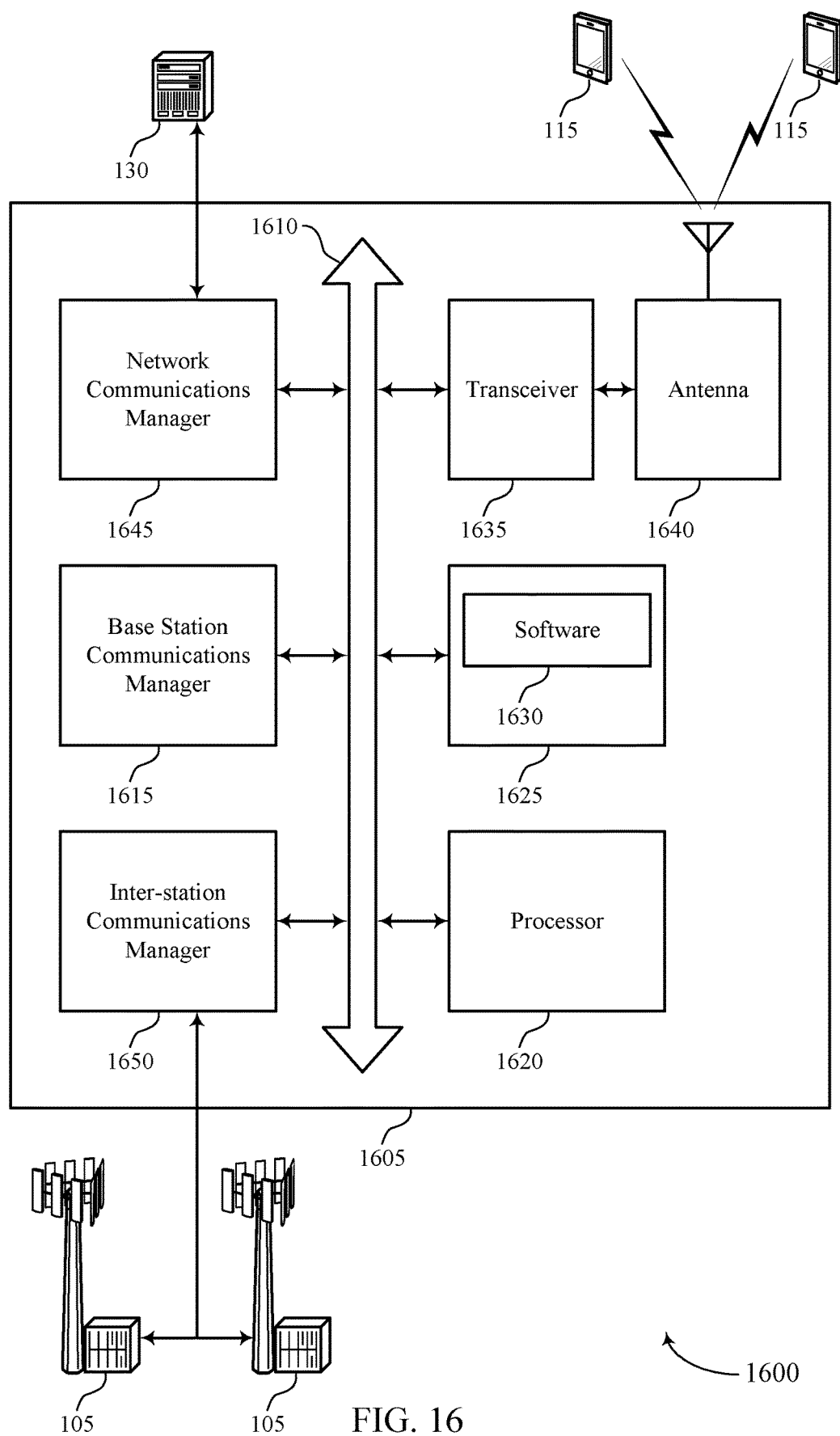
FIG. 16 illustrates a block diagram of a system including a base station that supports beam specific timing advance command parameters in accordance with aspects of the present disclosure.

FIG. 16 shows a diagram of a system 1600 including a device 1605 that supports beam specific timing advance command parameters in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting beam specific timing advance command parameters).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support beam specific timing advance command parameters. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an Long Term Evolution (LTE)/LTE-A wireless communication network technology to provide communication between base stations 105.

Figure 17:
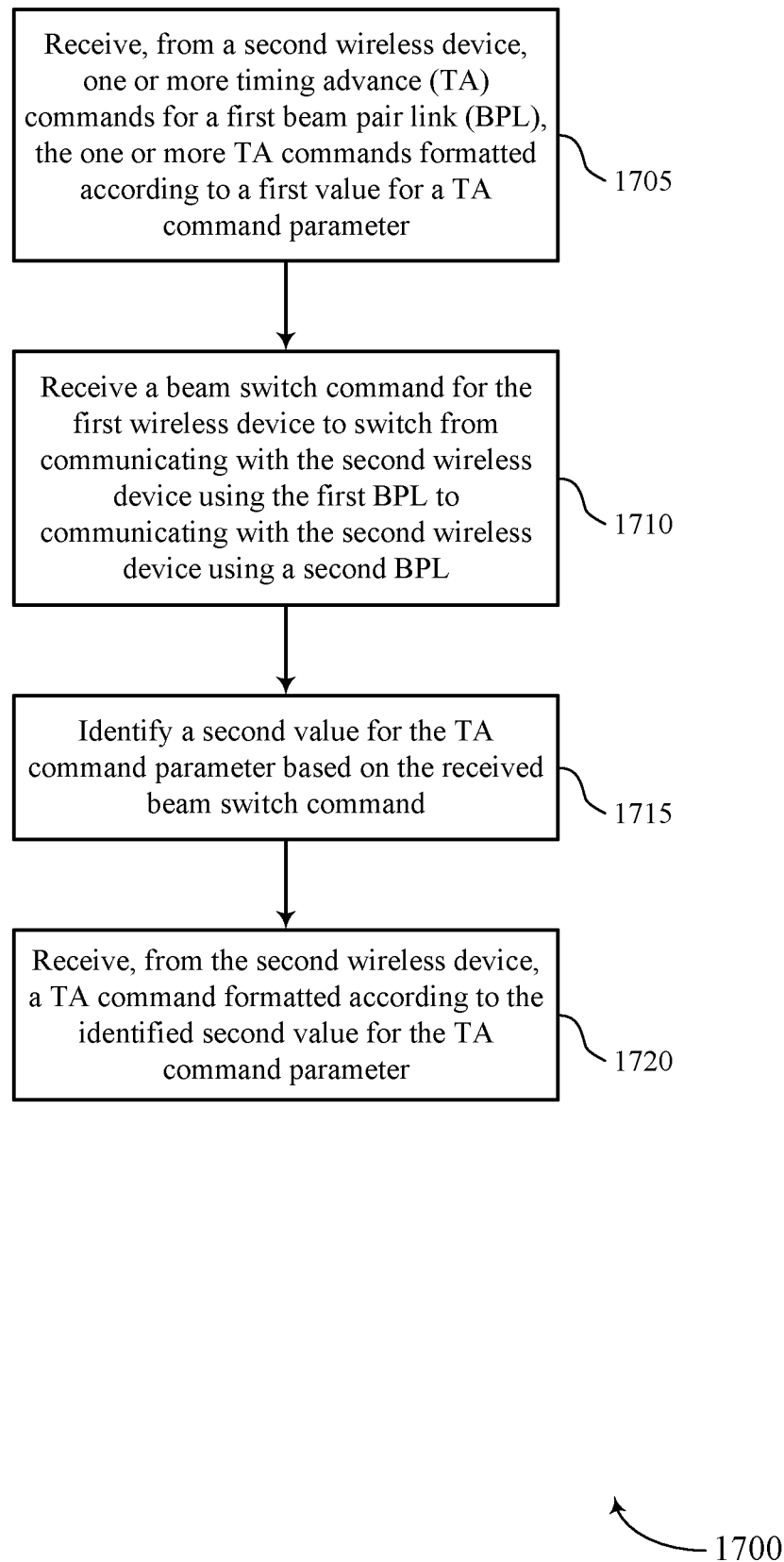
FIGS. 17 through 20 illustrate methods for beam specific timing advance command parameters in accordance with aspects of the present disclosure.

FIG. 17 shows a flowchart illustrating a method 1700 for beam specific timing advance command parameters in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1705 the UE 115 may receive, from a second wireless device, one or more TA commands for a first BPL, the one or more TA commands formatted according to a first value for a TA command parameter. The operations of 1705 may be performed according to the methods described herein. In certain examples, aspects of the operations of 1705 may be performed by a TA command component as described with reference to FIGS. 9 through 12.

At 1710 the UE 115 may receive a beam switch command for the first wireless device to switch from communicating with the second wireless device using the first BPL to communicating with the second wireless device using a second BPL. The operations of 1710 may be performed according to the methods described herein. In certain examples, aspects of the operations of 1710 may be performed by a beam switch command component as described with reference to FIGS. 9 through 12.

At 1715 the UE 115 may identify a second value for the TA command parameter based at least in part on the received beam switch command. The operations of 1715 may be performed according to the methods described herein. In certain examples, aspects of the operations of 1715 may be performed by a TA command parameter component as described with reference to FIGS. 9 through 12.

At 1720 the UE 115 may receive, from the second wireless device, a TA command formatted according to the identified second value for the TA command parameter. The operations of 1720 may be performed according to the methods described herein. In certain examples, aspects of the operations of 1720 may be performed by a TA command component as described with reference to FIGS. 9 through 12.

Figure 18:
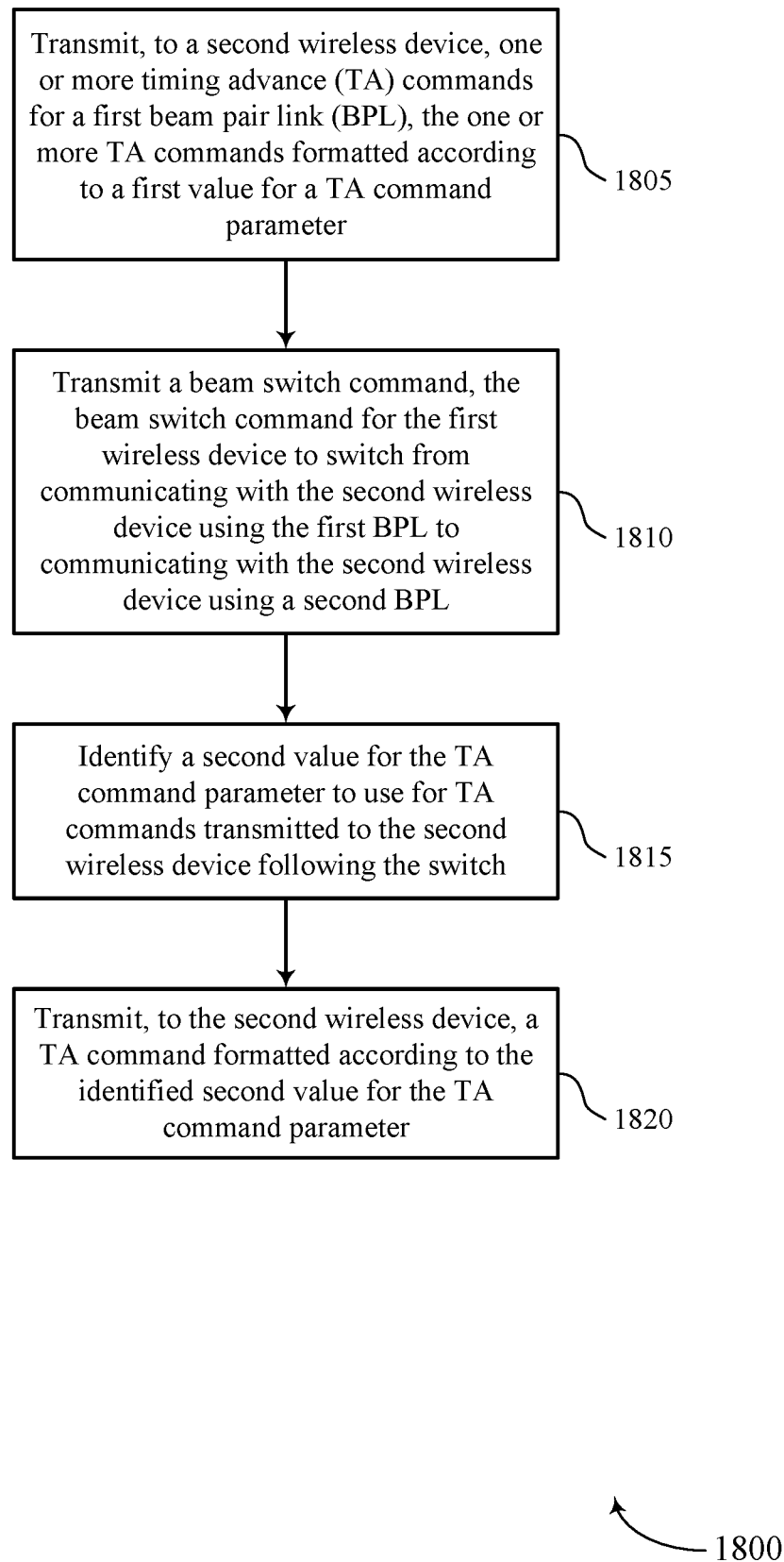

FIG. 18 shows a flowchart illustrating a method 1800 for beam specific timing advance command parameters in accordance with aspects of the present disclosure. The operations of method 1800 may be implemented by a base station 105 or its components as described herein. For example, the operations of method 1800 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may transmit, to a second wireless device, one or more TA commands for a first BPL, the one or more TA commands formatted according to a first value for a TA command parameter. The operations of 1805 may be performed according to the methods described herein. In certain examples, aspects of the operations of 1805 may be performed by a TA command component as described with reference to FIGS. 13 through 16.

At 1810 the base station 105 may transmit a beam switch command, the beam switch command for the first wireless device to switch from communicating with the second wireless device using the first BPL to communicating with the second wireless device using a second BPL. The operations of 1810 may be performed according to the methods described herein. In certain examples, aspects of the operations of 1810 may be performed by a beam switch command component as described with reference to FIGS. 13 through 16.

At 1815 the base station 105 may identify a second value for the TA command parameter to use for TA commands transmitted to the second wireless device following the switch. The operations of 1815 may be performed according to the methods described herein. In certain examples, aspects of the operations of 1815 may be performed by a TA command parameter component as described with reference to FIGS. 13 through 16.

At 1820 the base station 105 may transmit, to the second wireless device, a TA command formatted according to the identified second value for the TA command parameter. The operations of 1820 may be performed according to the methods described herein. In certain examples, aspects of the operations of 1820 may be performed by a TA command component as described with reference to FIGS. 13 through 16.

Figure 19:
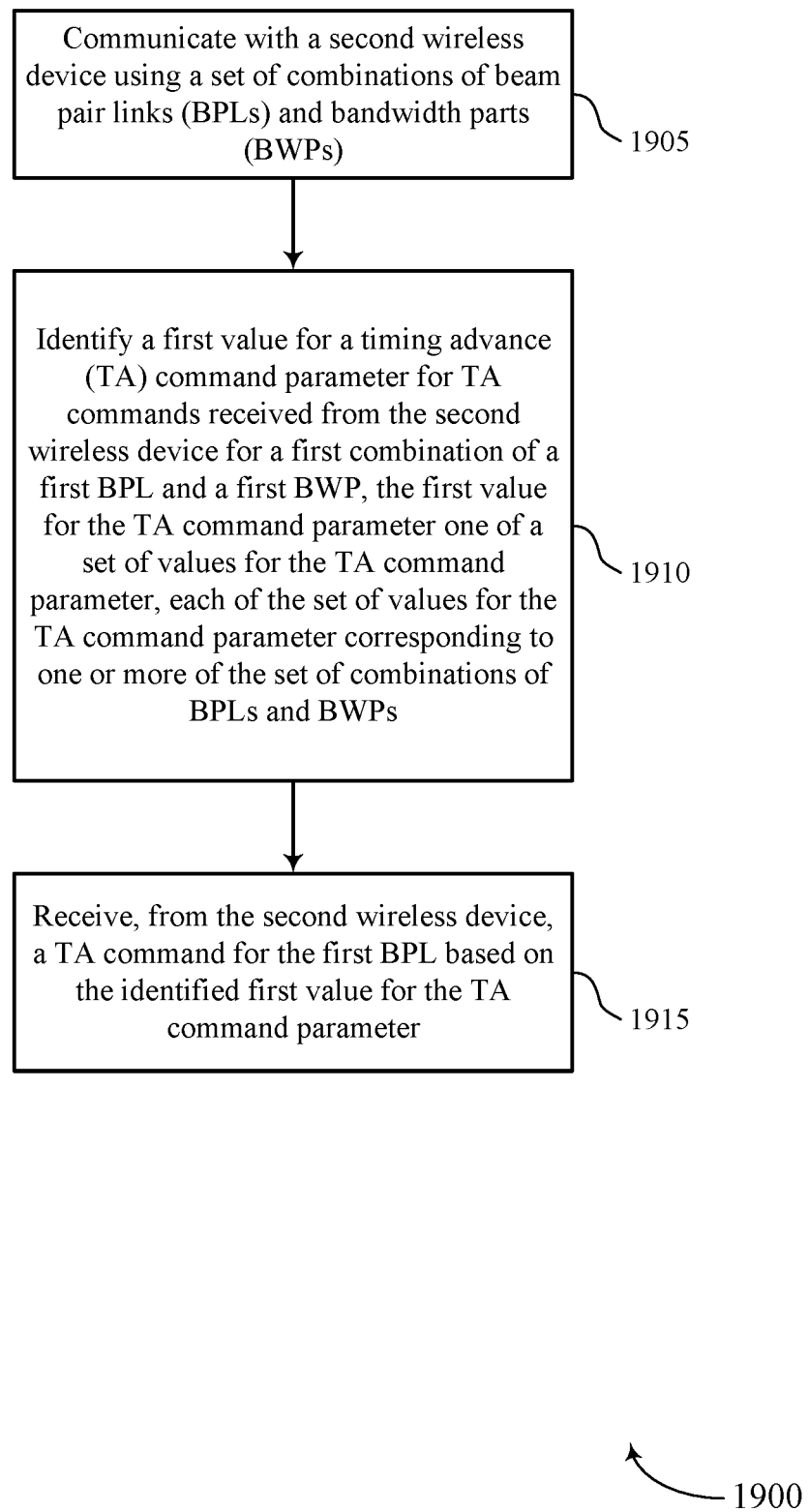

FIG. 19 shows a flowchart illustrating a method 1900 for beam specific timing advance command parameters in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At 1905 the UE 115 may communicate with a second wireless device using a plurality of combinations of beam pair links (BPLs) and BWPs. The operations of 1905 may be performed according to the methods described herein. In certain examples, aspects of the operations of 1905 may be performed by a combination component as described with reference to FIGS. 9 through 12.

At 1910 the UE 115 may identify a first value for a TA command parameter for TA commands received from the second wireless device for a first combination of a first BPL and a first BWP, the first value for the TA command parameter one of a plurality of values for the TA command parameter, each of the plurality of values for the TA command parameter corresponding to one or more of the plurality of combinations of BPLs and BWPs. The operations of 1910 may be performed according to the methods described herein. In certain examples, aspects of the operations of 1910 may be performed by a TA command parameter component as described with reference to FIGS. 9 through 12.

At 1915 the UE 115 may receive, from the second wireless device, a TA command for the first BPL based at least in part on the identified first value for the TA command parameter. The operations of 1915 may be performed according to the methods described herein. In certain examples, aspects of the operations of 1915 may be performed by a TA command component as described with reference to FIGS. 9 through 12.

Figure 20:
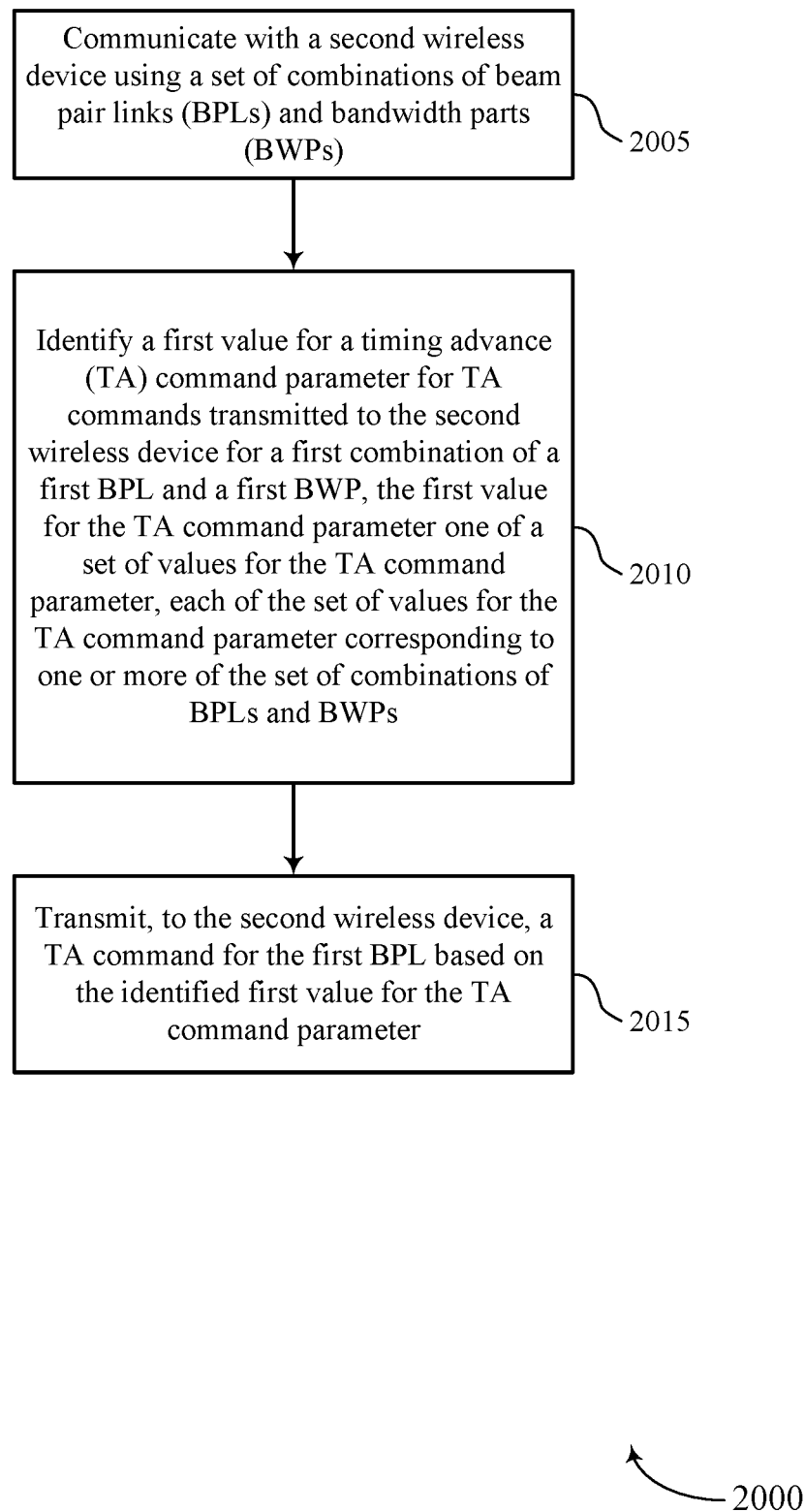

FIG. 20 shows a flowchart illustrating a method 2000 for beam specific timing advance command parameters in accordance with aspects of the present disclosure. The operations of method 2000 may be implemented by a base station 105 or its components as described herein. For example, the operations of method 2000 may be performed by a base station communications manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At 2005 the base station 105 may communicate with a second wireless device using a plurality of combinations of BPLs and BWPs. The operations of 2005 may be performed according to the methods described herein. In certain examples, aspects of the operations of 2005 may be performed by a combination component as described with reference to FIGS. 13 through 16.

At 2010 the base station 105 may identify a first value for a TA command parameter for TA commands transmitted to the second wireless device for a first combination of a first BPL and a first BWP, the first value for the TA command parameter one of a plurality of values for the TA command parameter, each of the plurality of values for the TA command parameter corresponding to one or more of the plurality of combinations of BPLs and BWPs. The operations of 2010 may be performed according to the methods described herein. In certain examples, aspects of the operations of 2010 may be performed by a TA command parameter component as described with reference to FIGS. 13 through 16.

At 2015 the base station 105 may transmit, to the second wireless device, a TA command for the first BPL based at least in part on the identified first value for the TA command parameter. The operations of 2015 may be performed according to the methods described herein. In certain examples, aspects of the operations of 2015 may be performed by a TA command component as described with reference to FIGS. 13 through 16.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
    receiving, from a second wireless device, one or more timing advance (TA) commands indicating a first TA value associated with a first beam pair link (BPL), the one or more TA commands formatted according to a first value for a TA parameter comprising a TA command size, or a TA granularity, or a combination thereof;
    receiving a beam switch command for the first wireless device to switch from communicating with the second wireless device using the first BPL to communicating with the second wireless device using a second BPL;
    estimating a second value for the TA parameter different from the first value for the TA parameter based at least in part on the received beam switch command; and
    receiving, from the second wireless device, a TA command indicating a second TA value associated with the second BPL, wherein the TA command is formatted according to the identified second value for the TA parameter.

2. The method of claim 1, wherein receiving the TA command comprises:
    receiving the TA command with the beam switch command or in a next TA command following the beam switch command.

3. The method of claim 1, further comprising:
    receiving an indication of a second TA offset for the second BPL, the second TA offset different from a first TA offset for the first BPL.

4. The method of claim 3, wherein the received TA command comprises the indication of the second TA offset.

5. The method of claim 3, further comprising:
    applying the second TA offset to an uplink transmission timing for the first wireless device based at least in part on receiving the beam switch command; and
    applying a TA value corresponding to the TA command to the uplink transmission timing.

6. The method of claim 3, further comprising:
    receiving an updated TA offset for the second BPL based at least in part on a number of TA commands received for the second BPL having exceeded a threshold.

7. The method of claim 1, further comprising:
    identifying a third value for the TA parameter to use for subsequent TA commands received from the second wireless device for the second BPL, the subsequent TA commands following the received TA command; and
    receiving one or more of the subsequent TA commands based at least in part on the identified third value for the TA parameter.

8. The method of claim 1, further comprising:
    identifying, for TA commands used for uplink transmission timing adjustment, a first TA command size, a second TA command size, and a third TA command size, wherein the identified second value for the TA parameter comprises one of the first TA command size, or the second TA command size, or the third TA command size.

9. The method of claim 1, wherein the TA command and the beam switch command are received in a same control signal.

10. The method of claim 1, further comprising:
    receiving a first indication of a first combination of TA command size and TA granularity for the first BPL; and receiving a second indication of a second combination of TA command size and TA granularity for the second BPL.

11. A method for wireless communication at a first wireless device, comprising:

transmitting, to a second wireless device, one or more timing advance (TA) commands indicating a first TA value associated with a first beam pair link (BPL), the one or more TA commands formatted according to a first value for a TA parameter comprising a TA command size, or a TA granularity, or a combination thereof;

transmitting a beam switch command, the beam switch command for the first wireless device to switch from communicating with the second wireless device using the first BPL to communicating with the second wireless device using a second BPL;

estimating a second value for the TA parameter different from the first value for the TA parameter to use for TA commands transmitted to the second wireless device following the switch; and transmitting, to the second wireless device, a TA command indicating a second TA value associated with the second BPL, wherein the TA command is formatted according to the identified second value for the TA parameter.

12. The method of claim 11, wherein transmitting the TA command comprises:

transmitting the TA command with the beam switch command or in a next TA command following the beam switch command.

13. The method of claim 11, further comprising:

transmitting an indication of a second TA offset for the second BPL to the second wireless device, the second TA offset different from a first TA offset for the first BPL.

14. The method of claim 13, further comprising:

comparing a first round trip time (RTT) of the first BPL with a second RTT of the second BPL; and determining the second TA offset based at least in part on the comparing.

15. The method of claim 13, further comprising:

determining that a number of TA commands transmitted for the second BPL exceeds a threshold; and transmitting an updated TA offset for the second BPL based at least in part on the determining.

16. The method of claim 11, further comprising:

identifying a third value for the TA parameter to use for subsequent TA commands transmitted to the second wireless device for the second BPL following the transmitted TA command; and transmitting one or more of the subsequent TA commands based at least in part on the identified third value for the TA parameter.

17. The method of claim 11, further comprising:

transmitting the one or more TA commands for the first BPL formatted according to a first TA command size;

transmitting the TA command for the second BPL formatted according to a second TA command size, the identified second value for the TA parameter comprising the second TA command size; and transmitting a third TA command formatted according to a third TA command size.

18. A method for wireless communication at a first wireless device, comprising:

communicating with a second wireless device using a plurality of combinations of beam pair links (BPLs) and bandwidth parts (BWPs);

identifying a first value for a timing advance (TA) command parameter for TA commands received from the second wireless device for a first combination of a first BPL and a first BWP, the first value for the TA parameter one of a plurality of values for the TA parameter comprising a TA command size, or a TA granularity, or a combination thereof, each of the plurality of values for the TA parameter corresponding to one or more of the plurality of combinations of BPLs and BWPs; and receiving, from the second wireless device, a TA command for the first BPL based at least in part on the identified first value for the TA parameter.

19. The method of claim 18, wherein the TA parameter further comprises a TA offset.

20. The method of claim 18, wherein each of the plurality of values for the TA parameter corresponds to a respective one combination of the plurality of combinations of BPLs and BWPs.

21. The method of claim 18, further comprising:

receiving a downlink control information (DCI) signal, or a radio resource control (RRC) signal, or a media access control (MAC) control element (CE), or a combination thereof, that comprises an indication of the first value for the TA parameter.

22. The method of claim 18, wherein identifying the first value for the TA parameter further comprises:

receiving an indication of a reference value for the TA parameter; and identifying the first value for the TA parameter based at least in part on the indication of the reference value for the TA parameter.

23. A method for wireless communication at a first wireless device, comprising:

communicating with a second wireless device using a plurality of combinations of beam pair links (BPLs) and bandwidth parts (BWPs);

identifying a first value for a timing advance (TA) command parameter for TA commands transmitted to the second wireless device for a first combination of a first BPL and a first BWP, the first value for the TA parameter one of a plurality of values for the TA parameter comprising a TA command size, or a TA granularity, or a combination thereof, each of the plurality of values for the TA parameter corresponding to one or more of the plurality of combinations of BPLs and BWPs; and transmitting, to the second wireless device, a TA command for the first BPL based at least in part on the identified first value for the TA parameter.

24. The method of claim 23, wherein the TA parameter comprises a TA offset.

25. The method of claim 23, wherein each of the plurality of values for the TA parameter corresponds to a respective one combination of the plurality of combinations of BPLs and BWPs.

26. The method of claim 23, wherein identifying the first value for the TA parameter further comprises:

transmitting an indication of a reference value for the TA parameter; and identifying the first value for the TA parameter based at least in part on the indication of the reference value for the TA parameter.

27. The method of claim 23, wherein identifying the first value for the TA parameter further comprises:
   identifying a reference combination of the plurality of combinations of BPLs and BWPs; and
   identifying the first value for the TA parameter based at least in part on the identified reference combination.

28. The method of claim 27, further comprising:
   identifying a value for one or more additional TA parameters based at least in part on the identified reference combination.

* * * * *